United States Patent [19]
Igarashi et al.

[11] Patent Number: 6,124,769
[45] Date of Patent: Sep. 26, 2000

[54] ELECTRONIC DEVICE, AND ITS FABRICATION METHOD

[75] Inventors: Katsuhiko Igarashi; Sunao Masuda; Tomoko Uchida; Yasumichi Tokuoka; Shigeki Sato, all of Chiba, Japan

[73] Assignee: TDK Corporation, Tokyo, Japan

[21] Appl. No.: 09/327,169

[22] Filed: Jun. 7, 1999

Related U.S. Application Data

[63] Continuation of application No. PCT/JP98/04521, Oct. 6, 1998.

[30] Foreign Application Priority Data

| Oct. 6, 1997 | [JP] | Japan | 9-289110 |
| Oct. 27, 1997 | [JP] | Japan | 9-311460 |
| Dec. 10, 1997 | [JP] | Japan | 9-361775 |
| Mar. 30, 1998 | [JP] | Japan | 10-102168 |

[51] Int. Cl.[7] ....................................................... H03H 1/02
[52] U.S. Cl. .................. 333/172; 361/321.3; 361/321.4; 338/254
[58] Field of Search ......................... 333/172; 361/321.2, 361/321.3, 321.4, 321.5; 338/204, 254

[56] References Cited

U.S. PATENT DOCUMENTS 3,353,124  11/1967  Dilger ..................................... 333/172

FOREIGN PATENT DOCUMENTS

| 1-316923 | 12/1989 | Japan . |
| 4-154104 | 5/1992 | Japan . |
| 5-13266 | 1/1993 | Japan . |
| 5-3131 | 1/1993 | Japan . |
| 5-283283 | 10/1993 | Japan ..................................... 333/172 |
| 10-312934 | 11/1998 | Japan . |

*Primary Examiner*—Justin P. Bettendorf
*Attorney, Agent, or Firm*—Oblon, Spivak, McClelland, Maier & Neustadt, P.C.

[57] ABSTRACT

The invention provides an electronic device comprising a first metal layer containing a first metal converted into an oxide upon firing in an oxidizing atmosphere and a second metal layer formed by firing of a second metal particle containing a metal that is not oxidized upon firing in an oxidizing atmosphere, with an intermediate oxide layer interleaved between these two metal layers. The intermediate oxide layer contains an oxide of the first metal contained in the first metal layer. Preferably, the second metal particle contained in the second metal layer is dispersed in the intermediate oxide layer. A uniform oxide layer is obtained at a simple step, and the resistance value provided by the oxide layer is easily controllable with high precision. It is thus possible to achieve an electronic device in which the bonding strength of the oxide layer with respect to the other metal-containing layer is improved with an improvement in the bonding strength with respect to lead wires.

25 Claims, 11 Drawing Sheets

×20

×200

DEPENDENCE OF RESISTANCE VALUE ON TEMPERATURE

DEPENDENCE ON FREQUENCY OF THE RESISTANCE VALUE OF THE INVENTIIVE RESISTOR

DEPENDENCE ON FREQUENCY OF THE RESISTANCE VALUE
OF THE COMPARATIVE RESISTOR

ELECTRONIC DEVICE, AND ITS FABRICATION METHOD

This application is a continuation of PCT/JP98/04521 filed Oct. 6, 1998.

TECHNICAL ART

The present invention relates generally to an electronic device comprising elements such as resistor, magnetic, insulator and semiconductor elements, each of a thin-film structure, and more particularly to an electronic device comprising an intermediate oxide layer between two metal layers, and a fabrication method thereof.

BACKGROUND ART

So far, a so-called vacuum thin-film formation technique such as a sputtering technique has generally be used to form a thin yet uniform oxide film between metal layers. When an oxidized film is formed by such a technique at a certain limited site in an ultrasmall electronic part of submillimeter order, dedicated masking is required, resulting in a drop of mass manufacturability and, hence, cost increases.

There is also available a so-called thick-film formation technique wherein a thick film is formed of a paste comprising an oxide dispersed in a vehicle by a screen printing process, a transfer process, a dipping process or the like. In this case, there is a certain limit to the formation of a uniform thick film of submicron order. Further, this technique involves elaborate process steps, because one metal layer is first formed, an oxide layer is then formed, and another metal layer is finally formed. Furthermore, it is often impossible to obtain any desired oxide film because some limitation is often placed on the firing atmosphere depending on the composition of the oxide.

It is here noted that an oxide layer has generally negative temperature characteristics. For some systems used in an environment having varying temperature conditions, however, it is desired to use therein a device having stable temperature characteristics or positive temperature characteristics.

By the way, a resistor chip is usually obtained by forming a resistor (film) on an insulator such as an alumina insulator. To this end, the resistor is first pasted, and the paste is then formed as by a screen printing process, followed by baking thereof to the alumina substrate. For such a resistor, a ruthenium oxide base resistor is primarily used optionally with tin oxide, tantalum oxide, etc. The resistor, comprising a mixture of high-resistance conductive particles, glass and a binder, is pasted, printed or otherwise formed at a predetermined position on an alumina substrate, and fired at a high temperature of 600° C. or greater so that it can be baked to the substrate.

However, the resistance value is likely to vary with baking temperature. Especially upon baking for which atmospheric control is needed, the resistance value varies largely. In addition, a problem arises due to the incorporation of much glass component. That is, when baking is again carried out for the formation of other part, the glass is diffused under the influence of re-baking into the substrate, resulting in large resistance value variations.

When the terminal electrode portion of the resistor chip is plated, it is required to coat a protective film of resin or the like on the resistor formed by baking to provide protection against plating, because of the incorporation of much glass therein. Otherwise, plating erodes the glass or the like, and so causes large resistance value variations.

For most power supplies for recent electronic equipment, switching power supplies or DC-DC converters are used, and among capacitors used for these power supplies, there is a power supply bypass capacitor. For this power supply bypass capacitor, a multilayer ceramic capacitor of low capacity, and an aluminum or tantalum electrolytic capacitor of high capacity are used depending on the power capacity and switching frequency thereof, and a circuit parameter of a smoothing choke used in combination therewith. In this regard, the electrolytic capacitor functions well as a power supply bypass (smoothing) capacitor because large capacity is easily obtained. However, problems with this capacitor are that its size is large, and its low-temperature characteristics are poor with a risk of short-circuit accidents. In addition, not only do losses due to equivalent series resistance (ESR) occur steadily thanks to a relatively high internal impedance with the generation of heat, but also smoothing characteristics become worse due to poor frequency characteristics. As recently introduced innovative techniques enable the dielectric material or internal electrode of a multilayer ceramic capacitor to become thinner and thinner and have more and more layers, the electrostatic capacity of the multilayer ceramic capacitor comes close to the electrostatic capacity of an electrolytic capacitor. For this reason, various attempts have been made to substitute the electrolytic capacitor by the multilayer ceramic capacitor.

Of factors contributing to a smoothing effect in a power supply bypass capacitor, a ripple noise factor is of importance. To what degree the ripple noise is reduced is determined by the equivalent series resistance (ESR) of the capacitor. Here let $\Delta Vr$ denote ripple voltage, $\Delta i$ represent a current passing through a choke coil, and ESR stand for equivalent series resistance. Then, $$\Delta Vr = \Delta i \times ESR$$

This equation teaches that the ripple voltage is reduced by decreasing ESR. For a power supply bypass circuit, it is thus preferable to use a capacitor having low ESR. For this reason, some efforts are directed toward the application of a multilayer ceramic capacitor of low EST to a power supply circuit.

In a secondary circuit of a DC-DC converter, a switching power supply or the like, however, the ESR of a smoothing circuit has a large influence on the phase characteristics of a feedback loop, especially resulting in a problem that the ESR becomes extremely low. That is, when a multilayer ceramic capacitor of low ESR is used as a smoothing capacitor, a secondary smoothing circuit is equivalently constructed only of L and C components, causing oscillation to take place readily because the phase component present in the circuit is limited to only ±90° and 0° components or there is no margin of phase at all. In a power supply circuit using a three-terminal regulator, too, a similar phenomenon appears as an oscillation phenomenon at the time of load fluctuations.

For this reason, an electronic part comprising a multilayer ceramic capacitor of enhanced equivalent series resistance (ESR) has already been proposed. For instance, Japanese Patent No. 2578264 shows that a metal oxidized film is formed on the surface of an external electrode of a multilayer ceramic capacitor, so that the metal oxidized film can function as resistance to enhance ESR, and the resistance value can be controlled by the thickness of the oxidized film. With the method of fabricating this capacitor, however, it is difficult to control the oxidation of terminal electrodes. Even a slight increase in the degree of oxidation causes the interior of the electrodes to be oxidized, failing to achieve the desisred capacitor function. Even if only the terminal electrodes can somehow be oxidized, there is then inconvenience because the terminal electrodes are oxidized. That is, a plated film is formed by electroless plating. When plating is carried out according to this method, however, it is required to coat a ceramic material with a resin or the like for the purpose of preventing the ceramic material from being plated. This does not only make the fabrication process complex, but also renders the adhesion between the oxide and the plated film (Ni film) extremely low. As a consequence, the plated film peels off the oxide peels, failing to obtain the sufficient mechanical strength required for an electronic part. In other words, a lead wire is likely to be detached from the nickelled film after attached thereto.

As typically described in JP-A 59-225509, there is also known a resistor obtained by stacking a ruthenium oxide or other resistor paste on a multilayer ceramic capacitor, and co-firing them. When this resistor is immediately provided with terminal electrodes, however, an equivalent circuit is constructed of an RC or RLC parallel circuit, and so any series circuit cannot be obtained. When it is intended to obtain a series circuit, the shape of the terminal electrode becomes complex, and the fabrication process becomes complex, accordingly.

DISCLOSURE OF THE INVENTION

One object of this invention is to provide a method of fabricating an electronic device, which enables a uniform oxide layer to be obtained by a simple process step, makes control of a resistance value provided by the oxide layer so easy that high precision is achieved, and improves a bonding strength of the oxide layer with respect to other metal-containing layer, and such an electronic device.

Another object of the invention is to provide an electronic device which is obtained without exposure of a resistor to a plating bath so that a resistance value thereof is substantially unlikely to vary upon plating, and can be combined with other part to easily incorporate resistance function therein, and a process of fabricating such an electronic device.

Yet another object of the invention is to provide an electronic device having zero or positive temperature characteristics.

Still yet another object of the invention is to provide an electronic device which can be fabricated by a simple process step without recourse to any dedicated firing conditions and at an ever-lower cost, enables a series RC or RLC circuit to be readily obtained, makes resistance value control easy, and includes a terminal electrode to which a lead is firmly bonded with high bonding strength.

These objects are achievable by the inventions defined as (1) to (38).

(1) An electronic device comprising a first metal layer containing at least a metal and a second metal layer formed by firing of a metal particle, with an intermediate oxide layer interleaved between said two metal layers, wherein:
an oxidation-reduction equilibrium curve for the metal particle contained in said second metal layer is positioned above an oxidation-reduction equilibrium curve for the metal contained in said first metal layer, and
said intermediate oxide layer comprises an oxide of the metal contained in said first metal layer.

(2) The electronic device according to (1), wherein:
electrical conduction is made between said first metal layer and said second metal layer via said intermediate oxide layer, and
said intermediate oxide layer acts as a resistor.

(3) The electronic device according to (1) or (2), wherein:
said first metal layer comprises one or two or more of Fe, Co, Cu, and Ni, and
said second metal layer comprises one or two or more of Ag, Au, Pt, Pd, Rh, Ir, and Ru.

(4) The electronic device according to any one of (1) to (3), wherein said intermediate oxide layer comprises as an oxide one or two or more of FeO, $\alpha$-$Fe_2O_3$, $\gamma$-$Fe_2O_3$, $Fe_3O_4$, CoO, $Co_3O_4$, $Cu_2O$, $CU_3O_4$, CuO, and NiO.

(5) The electronic device according to any one of (1) to (4), wherein said first metal layer, said intermediate oxide layer, and said second metal layer comprise 0 to 20 wt % of glass.

(6) The electronic device according to any one of (1) to (5), wherein:
a dielectric layer and an internal electrode are alternately stacked one upon another to form a multilayer structure,
terminal electrodes formed at ends of said multilayer structure are electrically connected to said internal electrode to provide a capacitor, and
at least one of said terminal electrodes comprises, in order from an internal electrode side, said first metal layer, said intermediate oxide layer, and said second electrode layer.

(7) The electronic device according to (6), wherein an equivalent circuit includes a series RC or RLC circuit.

(8) The electronic device according to (6) or (7), wherein a layer of said internal electrode comprises Ni.

(9) The electronic device according to any one of (6) to (8), wherein said terminal electrodes are each provided on an outside with a plated layer.

(10) An electronic device comprising a first metal layer containing a first metal which provides an oxide upon firing in an oxidizing atmosphere and a second metal layer formed by firing of particles of a second metal which is not oxidized even upon firing in an oxidizing atmosphere, with an intermediate oxide layer interleaved between said two metal layers, wherein:
said intermediate oxide layer comprises an oxide of the first metal contained in said first metal layer, while the second metal particles contained in said second metal layer are dispersed in said intermediate oxide layer.

(11) The electronic device according to (10), wherein said second metal particles dispersed in said intermediate oxide layer are present in a metal particle state and/or in a state in which some metal particles are coalesced together.

(12) The electronic device according to (10) or (11), wherein said intermediate oxide layer has a conduction path in which some of said second metal particles dispersed therein are coalesced together.

(13) The electronic device according to any one of (10) to (12), wherein a content of said second metal particles dispersed in said intermediate oxide layer is 20 to 99% provided that a ratio of an area occupied by an oxide of said second metal particles, as identified by observation of a section of the formed intermediate oxide layer, with respect to an entire area of said intermediate oxide layer is represented by an entire area of dispersed particles/the entire area of said intermediate oxide layer×100.

(14) The electronic device according to any one of (10) to (13), wherein the second metal particles contained in said second metal layer have an average particle size of 0.01 to 10 $\mu$m.

(15) The electronic device according to any one of (10) to (14), wherein the first metal particles contained in said first metal layer have an average particle size of 0.1 to 5 μm, and the second metal particles contained in said second metal layer have an average particle size of 0.05 to 5 μm. (16) The electronic device according to any one of (10) to (15), wherein:

the second metal particles contained in said second metal layer comprise one or two or more metal elements selected from Ag, Pt, Rh, Ru, Ir, Au, and Pd, and said first metal layer comprises a metal other than said second metal component or an alloy of said metal with said second metal component.

(17) The electronic device according to any one of (10) to (16), wherein said second metal layer comprises a glass frit in an amount of 0 to 20 wt % relative to a total amount of metals.

(18) The electronic device according to (17), wherein said glass frit has a softening point of 350° C to 500° C. inclusive.

(19) The electronic device according to (17), wherein said glass frit has a softening point that is equal to or greater than 300° C. and lower than 350° C., or greater than 500° C. and 1,000° C. or lower.

(20) The electronic device according to any one of (10) to (19), wherein said first metal layer comprises one or two or more of Fe, Co, Cu, and Ni.

(21) The electronic device according to any one of (10) to (20), wherein said intermediate oxide layer comprises as an oxide one or two or more of FeO, α-$Fe_2O_3$, γ-$Fe_2O_3$, $Fe_3O_4$, CoO, $CO_3O_4$, $Cu_2O$, $Cu_3O_4$, CuO, and NiO.

(22) The electronic device according to any one of (10) to (21), wherein:

electrical conduction is made between said first metal layer and said second metal layer via said intermediate oxide layer, and said intermediate oxide layer acts as a resistor.

(23) The electronic device according to (22), wherein a resistor portion formed from said first metal layer to said second metal layer has a zero or positive temperature coefficient.

(24) The electronic device according to (22) or (23), wherein:

a dielectric layer and an internal electrode are alternately stacked one upon another to form a multilayer structure, terminal electrodes formed at ends of said multilayer structure are electrically connected to said internal electrode to provide a capacitor, and at least one of said terminal electrodes comprises, in order from an internal electrode side, said first metal layer, said intermediate oxide layer, and said second electrode layer.

(25) The electronic device according to any one of (22) to (24), wherein an equivalent circuit includes a series CR or (LC)R circuit.

(26) The electronic device according to (24) or (25), wherein a layer of said internal electrode comprises Ni.

(27) The electronic device according to any one of (24) to (26), wherein said terminal electrodes are each provided on an outside with a plated layer.

(28) A process of fabricating an electronic device comprising steps of:

providing pastes for first and second metal layers in which at least metal particles are dispersed in a vehicle, provided that an oxidation-reduction equilibrium curve for a metal contained in said paste for the second metal layer is positioned above an oxidation-reduction equilibrium curve for a metal contained in said paste for the first metal layer, coating, and drying said paste for the first metal layer on a substrate, carrying out firing in a neutral or reducing atmosphere in which the metal contained in said paste for the first metal layer is not oxidized, thereby obtaining a precursor to the first metal layer, coating, and drying said paste for the second metal layer on said precursor to the first metal layer, and carrying out firing under a partial oxygen pressure condition in which the metal contained in said precursor to the first metal layer is oxidized but the metal contained in said paste for the second metal layer is not oxidized, thereby forming an intermediate oxide layer on an interface of said precursor to the first metal layer with respect to said paste for the second metal layer and obtaining the first metal layer and the second metal layer.

(29) The electronic device fabrication process according to (28), which comprises steps of:

coating, drying, and firing said paste for the first metal layer to form a primer metal layer, forming a metal thin film on said primer layer by means of plating to form the first metal layer, and coating said paste for the second metal layer on the first metal layer.

(30) A method of fabricating an electronic device, comprising steps of:

providing a paste for a first metal layer in which first metal particles converted to an oxide upon firing in an oxidizing atmosphere are dispersed in at least a vehicle, and a paste for a second metal layer in which second metal particles not oxidized even upon firing in an oxidizing atmosphere are dispersed in at least a vehicle, coating, and drying said paste for the first metal layer on a substrate, carrying out firing in a neutral or reducing atmosphere in which the metal contained in said paste for the first metal layer is not oxidized, thereby forming a precursor to the first metal layer, coating, and drying said paste for the second metal layer on said precursor to the first metal layer, and carrying out firing in an oxidizing atmosphere to oxidize an interface of said precursor to the first metal layer with respect to said paste for the second metal layer, whereby an intermediate oxide layer is formed thereon and the second metal particles contained in the second metal layer are dispersed in said intermediate oxide layer, so that the first metal layer, the intermediate oxide layer, and the second metal layer are obtained.

(31) The electronic device fabrication method according to (30), which comprises steps of:

coating, drying, and firing said paste for the first metal layer to form a primer metal layer, forming a metal thin film on said primer metal layer by a plating process to form the first metal layer, and coating said paste for the second metal layer on the first metal layer.

(32) The electronic device fabrication method according to (30) or (31), wherein an average particle size of the second metal particles contained in said paste for the second metal layer is varied between 0.01 μm and 20 μm to regulate a resistance value of said intermediate oxide layer.

(33) The electronic device fabrication method according to any one of (30) to (32), wherein said paste for the second metal layer comprises a glass frit in an amount of 0 to 20 wt % relative to a total amount of metals, and a softening point of said glass frit is regulated to regulate the resistance value of said intermediate oxide layer.

(34) The electronic device fabrication method according to any one of (30) to (33), wherein the first metal particles contained in the first metal layer have an average particle size of 0.1 to 5 μm, the second metal particles in the second metal layer have an average particle size of 0.05 to 5 μm, and the second metal particles contained in the second metal layer are dispersed from the second metal layer to the first metal layer to form a path of the second metal particles.

(35) The electronic device fabrication method according to any one of (30) to (34), wherein:

a dielectric layer and an internal electrode layer are alternately stacked one upon another to form a green chip, said green chip is fired into a chip member, said paste for the first metal layer is coated on said chip member and firing is carried out in a neutral or reducing atmosphere to form a precursor to the first metal layer, and the intermediate oxide layer, said paste for the second metal layer is coated on said precursor, and firing is carried out in an oxidizing atmosphere to oxidize the vicinity of an interface of said precursor to the first metal layer and intermediate oxide layer with respect to the second metal layer, thereby forming terminal electrodes.

(36) The electronic device fabrication method according to any one of (30) to (34), wherein:

a dielectric layer and an internal electrode layer are alternately stacked on upon another to form a green chip, said green chip is fired into a chip member, said paste for the first metal layer is coated on said chip member, said paste for the second metal layer is coated on said paste for the first metal layer, firing is carried out in a neutral or reducing atmosphere to obtain a fired assembly said fired assembly is placed in an oxidizing atmosphere in the process of cooling to oxidize the vicinity of an interface of the fired paste of the first metal layer with respect to the second metal layer, thereby forming a terminal electrode layer.

(37) The electronic device fabrication method according to any one of (30) to (34), wherein:

a dielectric layer and an internal electrode layer are alternately stacked one upon another to form a green chip, a paste for a first electrode layer is coated on said green chip, said paste for the second metal layer is coated on said paste for the first electrode layer, firing is carried out in a reducing atmosphere to obtain a fired assembly, and said fired assembly is placed in an oxidizing atmosphere in the process of cooling to oxidize the vicinity of an interface of the fired paste for the first metal layer with respect to the second metal layer, thereby forming terminal electrodes.

(38) The electronic device fabrication method according to any one of (30) to (37), wherein the first metal layer comprises Cu and/or Ni, and the second metal layer comprises one or two or more of Ag, Pd, Pt, Rh, Ir, and Ru.

BEST MODE FOR CARRYING OUT THE INVENTION

Figure 1:
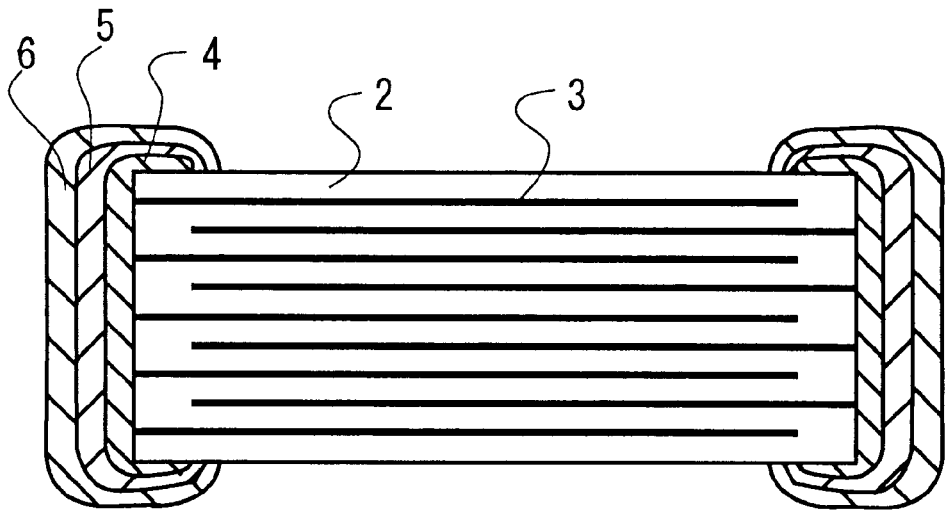
FIG. 1 is a sectional schematic depicting the basic construction of a CR composite electronic part according to the invention.

One preferable embodiment of the electronic device according to the invention comprises a first metal layer containing at least a metal and a second metal layer formed by firing of a metal particle, with an intermediate oxide layer interleaved between them. An oxidation-reduction equilibrium curve for the metal particle contained in the second metal layer is positioned above an oxidation-reduction equilibrium curve for the metal contained in the first metal layer, and the intermediate oxide layer contains an oxide of the metal particle or metal contained in the first metal layer.

The two different metal layers, i.e., the first, and second metal layers with the oxidation-reduction equilibrium curve for the metal contained in the latter positioned above the oxidation-reduction equilibrium curve for the metal contained in the former, are fired under such an oxygen partial pressure condition as to oxidize only the metal component contained in the first metal layer. This enables only an interface between the first metal layer and the second metal layer to be so oxidized that a uniform oxidized film can be obtained.

The first metal layer contains metal particles or a metal, and the second metal layer contains metal particles. The first metal layer is formed by a firing or plating process, and the second metal layer is formed by firing. No particular limitation is imposed on the metal components contained in the respective metal layers provided that the oxidation-reduction equilibrium curve for the metal component contained in the second metal layer is positioned above the oxidation-reduction equilibrium curve for the metal component contained in the first metal layer; appropriate metal components may be selected depending on what function is required for the electronic device, on what purpose the electronic device is used for, etc. For the oxidation-reduction equilibrium curve referred to herein, for instance, one that has been introduced by Ellingham and extended by Richardson and Jeffs is known.

According to the invention, such oxidation-reduction equilibrium curves for two metals should not overlap each other; the oxidation-reduction equilibrium curve for the metal contained in the second metal layer must be positioned above the oxidation-reduction equilibrium curve for the metal contained in the first metal layer. This implies that in the temperature range of 300 to 1,400° C. for instance, such relation that one curve is positioned above another curve should be clearer than that represented by the Ellingham curve. In numerical parlance, it is preferable that the lowest value of the oxygen partial pressure ratio upon oxidation of the metal contained in the second metal layer and the metal contained in the first metal layer is especially at least $10^{-10}$, and more especially at least $10^{-5}$, although the invention is not limited to them.

Referring here to exemplary combinations of the metal particle or metal contained in the first metal layer and the metal particle contained in the second metal layer, Cu—Ag is preferred for a resistor, Fe—Pd for a magnetic material, Ti—Pd for a dielectric material, and Zn—Ag, Cu—Ag, Ni—Ag, and Mn—Pd for a semiconductor. While these combinations are classified with a specific function in mind, it is understood that various modifications may be possible; for instance, a semiconductor may function as a resistor as in the case of an ordinary electronic part.

The particle size of the metal particles should be of the order of preferably 0.01 to 10 $\mu$m, and more preferably 0.05 to 5 $\mu$m although varying depending on the type thereof. The content of the metal component in the first electrode layer should be of the order of preferably 10 to 95 wt %, and more preferably about 20 to 90 wt % as calculated on a metal basis, and the content of the metal component in the second electrode layer should be of the order of preferably 85 to 100 wt %, and more preferably 90 to 100 wt % as calculated on a metal basis.

Preferably but not exclusively, the first, and second metal layers should be formed by ordinary processes such as dipping, screen printing, transfer, and dry plating processes, and especially a dipping process or a screen printing process. Preferably but not exclusively, the first metal layer formed should have a thickness of the order of usually 5 to 100 $\mu$m, and especially 10 to 80 $\mu$m. The second metal layer should preferably have a thickness of the order of usually 5 to 100 $\mu$m, and especially 10 to 80 $\mu$m.

When the first and second metal layers are each provided by a screen printing process, a dipping process or the like, it is preferable to mill together the metal particles and an organic vehicle into a paste. Usually, the paste for each metal layer contains, in addition to the metal particles, a glass frit serving as an inorganic binder, an organic binder, and a solvent.

The first, and second metal layers may contain a glass frit. Especially when the glass frit is used in the first metal layer, it is possible to enhance the adhesion of the first metal layer to the substrate serving as a primer layer. For the glass frit to be fired in a neutral or reducing atmosphere, it is preferable to use a glass frit that can still behave as glass even in such an atmosphere.

If the glass frit meets such requirements, then no particular limitation is placed on its composition. For instance, use may be made of one or two or more of glass frits selected from silicate glass ($SiO_2$: 20 to 80 wt % and $Na_2O$: 80 to 20 wt %), borosilicate glass ($B_2O_3$: 5 to 50 wt %, $SiO_2$: 5 to 70 wt %, PbO: 1 to 10 wt % and $K_2O$: 1 to 15 wt %), and alumina silicate glass ($Al_2O_3$: 1 to 30 wt %, $SiO_2$: 10 to 60 wt %, $Na_2O$: 5 to 15 wt %, CaO: 1 to 20 wt % and $B_2O_3$: 5 to 30 wt %). If required, the glass frit may be mixed with other additives at a given composition ratio, for instance, 0.01 to 50 wt % of CaO, 0.01 to 70 wt % of SrO, 0.01 to 50 wt % of BaO, 0.01 to 5 wt % of MgO, 0.01 to 70 wt % of ZnO, 0.01 to 5 wt % of PbO, 0.01 to 10 wt % of $Na_2O$, 0.01 to 10 wt % of $K_2O$, and 0.01 to 20 wt % of $MnO_2$. These additives may be added to the glass frit in a total amount of up to 50 wt %. Although no particular limitation is placed on the content of glass, the first metal layer should contain glass in an amount of usually about 0.5 to 20 wt %, and preferably about 1 to 10 wt % relative to the metal component, and the second metal layer should contain glass in an amount of about 0 to 15 wt %, and preferably about 0 to 10 wt % relative to the metal component.

No particular limitation is placed on the organic binder used; an appropriate selection may be made from binders generally used for ceramic materials. Such organic binders include ethyl cellulose, acrylic resin, butyral resin, etc., and may be used with a solvent such as terpineol, butyl carbitol, and kerosene. Preferably but not exclusively, the contents of the organic binder, and solvent in the paste should be the same as usual. For instance, the organic binder content should preferably be about 1 to 5 wt % while the solvent content should preferably be about 10 to 50 wt %.

If required, the paste for the metal layer may additionally contain additives such as various dispersants, plasticizers, dielectric materials, and insulating materials. The additives should preferably be used in a total amount of up to 1 wt %.

The oxide present in the intermediate oxide layer is an oxide of the metal particle or metal contained in the first metal layer, as previously noted. It is not always required that all of the metal particle or metal be oxidized; they may be present in a partly oxidized state. Preferably in this case, the oxide should account for at least 10 at %, and especially at least 25 at %, as calculated on an oxygen basis, of the total metal amount of the intermediate oxide layer. No particular limitation is imposed on the thickness of the intermediate oxide layer formed; the thickness may be regulated usually between about 0.01 $\mu$m and about 30 $\mu$m, and especially between about 0.05 $\mu$m and about 20 $\mu$m, although depending on firing conditions such as firing time, and firing temperature. It is thus also possible to regulate the characteristics of the resistor component, semiconductor component, magnetic component, and dielectric component obtained from the intermediate oxide layer. When the electronic device to be fabricated is a CR composite electronic device, the desired ESR value is obtained because the intermediate oxide layer functions as a resistor component. Although not particularly limited, the ESR value should preferably be in the range of 1 to 2,000 mΩ. It is here noted that since the first metal layer is formed while oxidized, glass, etc. are also present in the intermediate oxide layer.

When the intermediate oxide layer functions as a resistor, the resulting resistance value should be of the order of preferably 1 to 2,000 mΩ, and especially 10 to 1,000 mΩ. Usually, the presence, and composition of the oxide may be determined by EPMA, etc., and x-ray diffraction, respectively.

Another preferable embodiment of the electronic device according to the invention comprises a first metal layer containing a metal that is converted into an oxide upon firing in an oxidizing atmosphere and a second metal layer formed by firing of a metal particle that is not oxidized even upon firing in the oxidizing atmosphere, with an intimidate oxide interleaved between them. The intermediate oxide layer should preferably contain an oxide of the metal contained in the first metal layer, with the metal contained in the second metal layer dispersed therein.

The first metal layer contains a first metal that is converted into an oxide upon firing in an oxidizing atmosphere. By incorporating in the first metal layer the first metal that is converted into an oxide upon firing in the oxidizing atmosphere, it is possible to oxidize the vicinity of an interface between the first metal layer and the second metal layer during the formation of the second metal layer, thereby yielding the intermediate oxide layer. No particular limitation is placed on such a metal provided that it can be converted into an oxide in the oxidizing atmosphere. For instance, use may be made of one or two or more of Mn, Fe, Co, Ni, Cu, and Si, although Ni, Cu, an Ni—Cu alloy, etc. are preferred. By the term "oxidizing atmosphere" is herein intended an atmosphere having oxidizability higher than neutrality, for instance, an atmosphere having an oxygen partial pressure of preferably at least $10^{-3}$ atm., and more preferably at least $10^{-2}$ atm.

The metal may be treated at an oxygen partial pressure which meets such relation that the oxidation-reduction equilibrium curve (for instance, one introduced by Ellingham and extended by Richardson and Jeffs) for the second metal contained in the second metal layer is positioned above that for the first metal contained in the first metal layer, and at which the first metal layer is oxidized but the second metal layer is not. For some metals, however, it is required to place oxygen partial pressure and temperature under severe control, making the fabrication process complicated. For the metals contained in the first, and second metal layers, it is thus preferable to make a selection from metals that can be treated in both a neutral or reducing atmosphere and an oxidizing atmosphere because device fabrication is facilitated.

When the first metal in the first metal layer is present in a particulate state, the metal particles should have an average particle size of preferably about 0.01 to 100 μm, especially about 0.1 to 30 μm, more especially about 0.01 to 10 μm, and more preferably about 0.05 to 5 μm, especially about 0.1 to 5 μm, more especially about 0.2 to 3 μm, although varying depending on the type thereof. The content of the metal component in the first electrode layer should be of the order of preferably 10 to 95 wt %, and more preferably 20 to 90 wt % as calculated on a metal basis.

Preferably but not exclusively, the first metal layer should be formed by ordinary processes such as dipping, screen printing, transfer, and dry plating processes. However, the dipping or screen printing process is particularly preferred. Preferably but not exclusively, the first metal layer formed should have a thickness of the order of usually 5 to 100 μm, and especially 10 to 80 μm.

When the first metal layer is provided as by a screen printing or dipping process, it is preferable to mill together the metal particles and an organic vehicle into a paste. Usually, the paste for the metal layer contains, in addition to the metal particles, a glass frit serving as an inorganic binder, an organic binder, and a solvent.

The first, and second metal layers may contain a glass frit. Especially when the glass frit is used in the first metal layer, it is possible to enhance the adhesion of the first metal layer to the substrate serving as a primer layer. For the glass frit to be fired in a neutral or reducing atmosphere, it is preferable to use a glass frit that can still behave as glass even in such an atmosphere.

If the glass frit meets such requirements, then no particular limitation is placed on its composition. For instance, use may be made of one or two or more of glass frits selected from silicate glass ($SiO_2$: 20 to 80 wt % and $Na_2O$: 80 to 20 wt %), borosilicate glass ($B_2O_3$: 5 to 50 wt %, $SiO_2$: 5 to 70 wt %, PbO: 1 to 10 wt % and $K_2O$: 1 to 15 wt %), and alumina silicate glass ($Al_2O_3$: 1 to 30 wt %, $SiO_2$: 10 to 60 wt %, $Na_2O$: 5 to 15 wt %, CaO: 1 to 20 wt % and $B_2O_3$: 5 to 30 wt %). If required, the glass frit may be mixed with other additives at a given composition ratio, for instance, 0.01 to 50 wt % of CaO, 0.01 to 70 wt % of SrO, 0.01 to 50 wt % of BaO, 0.01 to 5 wt % of MgO, 0.01 to 70 wt % of ZnO, 0.01 to 5 wt % of PbO, 0.01 to 10 wt % of $Na_2O$, 0.01 to 10 wt % of $K_2O$, and 0.01 to 20 wt % of $MnO_2$. Although no particular limitation is placed on the content of glass, the first metal layer should contain glass in an amount of usually about 0.5 to 20 wt %, and preferably about 1 to 10 wt % relative to the metal component. It is here noted that the total content of the additives in the glass should preferably be 50 wt % or lower relative to the glass component being 100.

No particular limitation is placed on the organic binder used; an appropriate selection may be made from binders generally used for ceramic materials. Such organic binders include ethyl cellulose, acrylic resin, butyral resin, etc., and may be used with a solvent such as α-terpineol, butyl carbitol, and kerosene. Preferably but not exclusively, the contents of the organic binder, and solvent in the paste should be the same as usual. For instance, the organic binder content should preferably be about 1 to 5 wt % while the solvent content should preferably be about 10 to 50 wt %.

If required, the paste for the metal layer may additionally contain additives such as various dispersants, plasticizers, and insulating materials. The additives should preferably be used in a total amount of up to 1 wt %.

The second metal layer contains the second metal particles that are not oxidized even upon firing in an oxidizing atmosphere. By firing the second metal layer containing the second metal particles that are not oxidized in the oxidizing atmosphere, it is possible to oxidize the vicinity of an interface between the first metal layer and the second metal layer, so that the intermediate oxide layer can be formed. No particular limitation is imposed on such metal particles; use may be made of metal particles that are not oxidized upon firing in the oxidizing atmosphere. However, preference is given to one or two or more of Ag, Pt, Rh, Ru, Ir, Au, and Pd with Ag being particularly preferred.

The second metal particles in the second metal layer should have an average particle size of preferably about 0.01 to 20 μm, more preferably about 0.01 to 10 μm, even more preferably about 0.05 to 10 μm, and especially about 0.1 to 10 μm, more especially about 0.05 to 5 μm. At below 0.01 μm, metal particles are likely to coagulate together, providing a paste which is susceptible to cracking upon coating and drying. At a particle size exceeding 20 μm, the degree of oxidation of the first metal layer remains unchanged. This in turn causes the sinterability of the second electrode layer to become low, and so causes a plating solution to attack the oxidized film during post-firing plating.

By regulating the particle size of the second metal particles in the above range, it is possible to regulate the resistance value of the intermediate oxide layer. When metal particles having an average particle size of 0.01 to 3.0 μm are used in this case, the degree of dispersion of the metal particles into the oxidized film increases with an decrease in the resistance value of the intermediate oxide layer. Hence, such a particle size finds chief uses for low-resistance purposes. At an average particle size exceeding 3.0 μm, a relatively high resistance value is obtainable because of some restriction on the diffusion of the metal particles into the intermediate oxide layer. It is here understood that the resistance value of the intermediate oxide layer may be controlled by not only the above particle size, but also the composition, amount, etc. of glass as described later.

When the second metal particles have an average particle size in the range of 0.05 to 5 μm, and especially 0.05 to 3 μm, it is possible to disperse them into the intermediate oxide layer, thereby forming a path therein. In other words, the state of dispersion of the metal particles in the intermediate oxide layer is tantamount to the state of diffusion or dispersion of the oxidized layer formed in the first metal layer in the uncoalesced second metal particles. Some or all of these dispersed metal particles are put in a fused, bound and coagulated state, so that they can be usually present in a fine thread or fiber form, forming a conduction path running from the second metal layer to the first metal layer. Usually, the smaller the metal particles, the more susceptible they are to dispersion into the intermediate oxide layer. The formation of the path varies with the degree of dispersion of the metal particles, and the larger the amount of dispersion, the more easily the path is formed. This conduction path has a given resistance value because of its small sectional area. However, since the resistance is lower than that of the intermediate oxide layer, a substantial portion of the current passing from the second metal layer to the first metal layer is carried through this conduction path.

With an oxide metal used as a resistor, the resistor has usually negative temperature characteristics. However, the resistance provided by such a conduction path as mentioned above, because of being derived of the fact that the sectional area of the metal conductor is small, has nearly zero or positive temperature characteristics, rather than such negative temperature characteristics. It is thus possible to control the properties, and especially temperature characteristics of the electronic device depending on whether the resistance-providing medium is formed of the oxide in the intermediate oxide layer or the conduction path provided in the intermediate oxide layer. The conduction path makes an electrical connection between the second metal layer and the first metal layer. In this regard, it is not always required to make a perfect connection between the second metal layer and the first metal layer; the conduction path may be formed by a partial conduction passage. Alternatively, the second metal particles may be present in a discrete state.

The resistance value obtained through such a conduction path as mentioned above is of the order of usually 1 mΩ to 3 Ω, and especially 1 mΩ to 2 Ω.

The content of the second metal particles in the intermediate oxide layer is represented by the ratio between the area of a portion of the formed intermediate oxide layer occupied by the oxide of the second metal particles as identified upon observation of a section of the intermediate oxide layer (the entire area of individual particles or coalesced particles) and the entire area of the intermediate oxide layer, i.e., area ratio (%)=(entire area of diffused particles)/(entire area of the intermediate oxide layer)×100. In the invention, this ratio should be of the order of preferably 20 to 99%, more preferably 20 to 95%, and even more preferably 50 to 95%. The area ratio, for instance, may be found by calculating the entire area of the intermediate oxide layer and the entire area of the portion of the intermediate oxide layer occupied by the dispersed particles on the basis of image analysis of the intermediate oxide layer on an image analyzer.

The content of the metal component in the second electrode layer should be of the order of preferably 80 to 100 wt %, and more preferably 90 to 100 wt % as calculated on a metal basis.

Preferably but not exclusively, the second metal layer is formed by ordinary processes such as a dipping process, a screen printing process, and a transfer process. However, particular preference is given to the dipping or screen printing process. Preferably but not exclusively, the second metal layer should have a thickness of the order of usually 5 to 100 μm, and especially 10 to 80 μm.

When the second metal layer is provided as by the screen printing or dipping process, it is preferable to mill together the above metal particles and an organic vehicle into a paste. Usually, the paste for the metal layer contains, in addition to the above metal particles, a glass frit serving as an inorganic binder, an organic binder, and a solvent.

In the second metal layer, the resistance value of the intermediate oxide layer may be controlled by the glass frit. Usually, it is not particularly required to limit the composition of the glass frit because it is fired in an oxidizing atmosphere. For resistance control, e.g., to lower the resistance of the intermediate oxide layer, however, it is preferable that the glass has a softening point of 350° C. to 500° C. inclusive. To enhance the resistance of the intermediate oxide layer, it is preferable that the softening point of the glass is equal to or greater than 300° C. and less than 350° C. or greater than 500° C. and equal to or less than 1,000° C. For instance, borosilicate glass, lead borosilicate glass, etc. may be used with the addition thereto of BaO, CaO, SrO, ZnO, MnO, $MnO_2$, $Ti_2O_3$, $Bi_2O_3$, and $Al_2O_3$ to prepare a glass frit having such a softening point.

The reasons for limiting the softening point to the above temperature range are explained below. When a low resistance value is obtained, it is required to disperse the metal particles in the second metal layer into the oxidized layer simultaneously with the oxidation of the precursor to the first metal layer. To this end, the oxidation of the precursor to the first metal layer must be in coincidence with the behavior upon firing of the second metal layer. To achieve this, the softening point must be within the above temperature range. When a high resistance value is obtained at a glass softening point that is equal to or greater than 300° C. and less than 350° C., the second metal layer can be sintered well prior to the rapid oxidation reaction of the first metal layer with the result that the diffusion of the metal particles within the second metal layer can be inhibited. By regulating the softening point to greater than 500° C. and 1,000° C. or less, the firing reaction of the second metal layer can be so delayed that the dispersion of the metal particles within the second metal layer can be inhibited as mentioned above. It is here understood that the above range may fluctuate slightly depending on the type of the metal used for the metal layer, and so the softening point should preferably be regulated to a proper temperature for each of the metals used.

The glass content of the second metal layer is not particularly limited. Usually, however, the glass content should be of the order of 0 to 20 wt %, and preferably 0 to 10 wt % relative to the metal component. It is here understood that the method for promoting or delaying the firing of the second metal layer is not necessarily limited to one using such a glass frit as specified above; other methods using a commercially available resinate may also be used or the metal particles may be subjected to a sintering delay treatment. It is also understood that the above preferable range fluctuates more or less depending on the particle size of the metal particles used, the composition of the metal used, etc. For this reason, the glass content may be regulated to an appropriate value depending on these conditions.

The oxide present in the intermediate oxide layer is an oxide of the metal particle or metal contained in the first metal layer, as previously noted. It is not always required that all of the metal particle or metal be oxidized; they may be present in a partly oxidized state. Preferably in this case, the oxide should account for at least 10 at %, and especially at least 25 at %, as calculated on an oxygen basis, of the total metal amount of the intermediate oxide layer. No particular limitation is imposed on the thickness of the intermediate oxide layer formed; the thickness may be regulated usually between about 0.01 $\mu$m and about 30 $\mu$m, and especially between about 0.05 $\mu$m and about 20 $\mu$m, depending on the desired performance of the electronic device. The thickness of the intermediate oxide layer may be regulated depending on firing conditions such as firing time, and firing temperature. It is thus also possible to regulate the characteristics of the resistor component, semiconductor component, magnetic component, and dielectric component obtained from the intermediate oxide layer. Usually, the presence, and composition of the oxide may be determined by EPMA, and x-ray diffraction, etc., respectively.

Usually, the first metal layer, intermediate oxide layer, and second metal layer, each in a layer form, are formed in this order. However, it is noted that the metal present in a portion of the intermediate oxide layer may be in an oxidized state, and that the metal in the second metal layer is usually dispersed in a sintered form or in a particulate form being sintered. The grain size of the dispersed metal should be of the order of 0.1 to 5 $\mu$m although no particular limitation is imposed thereon. In one case, the dispersed metal is present in a layer form in the intermediate oxide layer, and in another case, the dispersed metal particles are present in a fine thread form of path where they are bound together. In the latter case, the thread form of path is often of complex crimped shape rather than in a linear form. Hence, the state of transition from the first metal layer to the intermediate oxide layer and/or the state of transition form the intermediate oxide layer to the second metal layer may have a gradient.

The electronic device of the invention comprises, in order from the substrate side, a first electrode layer, an intermediate oxide layer, and a second electrode layer. The electronic device may be provided on its outermost side, i.e., the second electrode layer with a plated layer. The plated layer may be formed of nickel, tin, solder, etc. However, the plated layer should preferably be formed of a nickel plating layer and a tin layer or a tin-lead alloy solder layer. In the plated layer, the nickel plating layer is provided on the second electrode layer, and the outer plating layer is formed of a material having a low resistivity and good wettability of solder, preferably tin or a tin-lead alloy solder, and more preferably a tin-lead alloy solder. The plated layer is provided not only to improve the wettability of solder upon attachment, and mounting of lead wires, but also to ensure connections between a wiring or interconnecting board and lead wires, etc. In addition, the plated layer is provided all over the second metal layer so that it can stabilize the resistance value of the electronic device, improve aesthetically the appearance of the electronic device, and protect the electrode layers.

No particular limitation is placed on how to form the plated layer; use may be made of dry plating using a sputtering or evaporation process. However, it is preferable to rely on a wet plating process using electrolytic plating or electroless plating known in the art, because the plated layer can be easily provided. When the wet process is used, it is preferable to use an electrolytic plating process because the nickel plating layer is provided on terminal electrodes. The tin or tin-lead alloy solder layer may be provided by either the electrolytic plating process or the electroless plating process because the nickel layer on which the plating layer is deposited is a metal. However, preference is given to the electrolytic plating process. The plated layer should have a thickness of the order of preferably 0.1 to 20 $\mu$m, and especially 1 to 20 $\mu$m for each of the nickel plating layer and the outer plating layer.

No particular limitation is imposed on the substrate for the electronic device. That is, use may be made of a simple electronic device carrier or substrate formed of, for instance, inorganic materials such as glass, alumina, and silicon or various resin materials. When the invention is applied to chip members or composite parts such as a resistor chip, a CR composite part, an LR composite part, and an LCR composite part, a multilayer chip, capacitor or inductor comprising an insulator and a conductor is used as the substrate. In this case, the substrate is formed on a terminal portion.

Next, how to fabricate the electronic device of the invention is explained.

The pastes for the first, and second metal layers are each prepared by milling the above various metal particles together with the above organic vehicle into a paste.

The paste for the first metal layer is coated on such a substrate as mentioned above by printing, transfer or dipping, followed by drying, and firing. While no particular limitation is imposed on drying conditions, it is understood that drying should usually be carried out at about 50 to 200° C., and especially about 60 to 200° C. for about 5 to 10 minutes or about 10 to 60 minutes. Firing must be carried out under conditions wherein the first metal layer is not oxidized, and is performed in a neutral or reducing atmosphere. While no particular limitation is imposed on an atmospheric gas, it is understood that nitrogen gas or a nitrogen-hydrogen mixed gas is preferred. The concentration of nitrogen in the mixed gas should be in the range of preferably 50 to 99%, and more preferably 80 to 98%. The firing temperature should be in the range of preferably 300 to 1,500° C., and more preferably 600 to 1,000° C. Referring to the firing time, the paste should preferably be held in the above temperature range for about 0 to 1 hour.

Then, the paste for the second metal layer is coated on the thus obtained precursor to the first metal layer by printing, transfer or dipping, followed by drying. At this time, the paste may be printed according to a pattern depending on the function, and circuit of the electronic device. While no particular limitation is imposed on drying conditions, it is understood that drying should usually be carried out at about 50 to 200° C. for about 5 to 10 minutes.

Subsequently, firing is carried out at an oxygen partial pressure at which the metal particles contained in the first metal layer precursor are oxidized but the metal particles contained in the second metal layer paste are not. Thus, the oxygen partial pressure may be appropriately regulated depending on the type of the metal particles, etc. The firing temperature should be in the range of preferably 400 to 900° C., and more preferably 500 to 800° C., and resistance value control may be carried out in this temperature range. Referring to the firing time, the paste should preferably be held for about 0 to 1 hour in the above temperature range. In this process, the vicinity of an interface between the first metal layer and the second metal layer is oxidized. Preferably at the same time, the metal in the second metal layer is dispersed in the intermediate oxide layer to complete the intermediate oxide layer together with the first, and second metal layers.

It is here noted that the first metal layer may be provided by plating. In this case, the paste for the first metal layer is first coated on the substrate to form a primer layer, and a plated layer is then provided on the primer layer. The provision of the primer layer makes it easy to form the plated layer. The plated layer may be formed by either wet plating such as electrolytic plating, and electroless plating or a dry plating process such as a sputtering process, and an evaporation process.

Next, applications of the electronic device of the invention to a resistor chip and multilayer ceramic capacitor are explained. In the resistor chip and multilayer ceramic capacitor, barium titanate is used for an insulator or dielectric material while a conduction chip is formed by embedding nickel as an internal conductor therein. Thus, both end faces of the resistor chip are electrically connected to each other, and the internal conductor is alternately connected together on both end faces of the multilayer ceramic capacitor.

No particular limitation is imposed on the insulator material for forming an insulator layer: use may be made of various insulator materials. For instance, it is preferable to use titanium oxides, titanate base composite oxides or their mixtures. For the titanium oxide, $TiO_2$ to which, if required, NiO, CuO, $Mn_3O_4$, $Al_2O_3$, MgO, $SiO_2$, etc. may be added in a total amount of about 0.001 to 30 wt % is typically used, and for the titanate base composite oxide, barium titanate ($BaTiO_3$) is typically used, with the atomic ratio of Ba/Ti being preferably of the order of 0.95 to 1.20. The titanate base composite oxide ($BaTiO_3$) may contain MgO, CaO, $Mn_3O_4$, $Y_2O_3$, $V_2O_5$, ZnO, $ZrO_2$, $Nb_2O_5$, $Cr_2O_3$, $Fe_2O_3$, $P_2O_5$, SrO, $Na_2O$, $K_2O$, etc. in a total amount of about 0.001 to 30 wt %. In addition, the titanate base composite oxide may contain $(BaCa)SiO_3$ glass, etc. for the purpose of control of firing temperature, linear expansion coefficient, etc. The insulator layer should usually have a thickness of the order of 10 to 1,000 µm although no particular limitation is placed thereon.

No particular limitation is imposed on the dielectric material for forming a dielectric layer; various dielectric materials may be used. However, the dielectric layer should preferably be formed of, for instance, titanium oxides, titanate base composite oxides or their mixtures, all referred to above. For the titanium oxide, the same as mentioned above may be used. The titanium oxide may additionally contain glass such as $(BaCa)SiO_3$ glass for the purpose of control of firing temperature, linear expansion coefficient, etc. One single dielectric layer should usually have a thickness of the order of 5 to 20 µm although no particular limitation is imposed thereon. The number of dielectric layers to be stacked together should usually be about 2 to 300 although no particular limitation is again imposed thereon.

No particular limitation is imposed on the conductive material contained in the internal conductor. However, if a resistant-to-reduction material is used as the insulator layer-forming material, it is then preferable to use an inexpensive base material, etc. For the metal used as the conductive material, it is preferable to use Ni or an Ni alloy. An Ni alloy with at least one element selected from Mn, Cr, Co, Al, etc. is preferred for the Ni alloy. Preferably in this case, the content of Ni in the alloy should be 95 wt % or greater.

It is here understood that Ni or the Ni alloy may additionally contain various trace components such as P in an amount of up to about 0.1 wt %.

The thickness of the internal conductor may be determined depending on its purpose, etc., and should usually be of the order of 0.5 to 5 µm.

Hereinafter, how to fabricate the resistor chip and multilayer ceramic capacitor is explained.

To fabricate the resistor chip and multilayer ceramic capacitor according to the invention, a green chip is prepared by an ordinary printing or sheet-making process using a paste, and then firing the green chip. Subsequently, the paste for the first metal layer is formed by coating on the green chip by a dipping process or the like, and fired in a neutral or reducing atmosphere to form a precursor to the first metal layer on both its end faces, thereby obtaining a chip member with electrical continuity made between both its end faces. The paste for the second metal layer is formed by coating on both end faces of the obtained chip member, and fired in an oxidizing atmosphere to oxidize the metal contained in the first metal layer precursor, thereby forming an intermediate oxide layer in the vicinity of an interface between the first metal layer precursor and the second metal layer paste. At the same time, the oxidized layer is diffused into the uncoalesced metal contained in the second metal layer with the result that the metal contained in the second metal layer is dispersed in the oxidized layer. By control of the amount of the metal dispersed, it is then possible to control the resistance value of the intermediate oxide layer as detailed below.

The paste for the insulator layer, or the paste for the dielectric layer is prepared by milling the raw material for the insulator layer or the dielectric layer together with an organic vehicle.

Powders corresponding to the composition of the insulator layer or dielectric layer are used for the raw materials for the insulator layer or dielectric layer. No particular limitation is placed on how to manufacture the raw materials for the insulator layer or dielectric layer. For instance, when barium titanate is used as the titanate base composite oxide, it is preferable to use a process wherein $BaTiO_3$ synthesized by hydrothermal synthesis, etc. is mixed with subordinate raw materials. It is also preferable to use a dry synthesis process wherein a mixture of $BaCO_3$, $TiO_2$ and subordinate raw materials are calcined for a solid-phase reaction, or a hydrothermal synthesis process. Alternatively, a mixture of a precipitate obtained by a co-precipitation process, a sol-gel process, an alkali hydrolysis process, a precipitation mixing process or the like with subordinate raw materials may be calcined for synthesis. For the subordinate raw materials, at least one of oxides or various compounds converted to oxides upon firing, for instance, carbonates, oxalates, nitrates, hydroxides, and organic metal compounds may be used.

The average particle size of the raw material for the insulator layer or dielectric layer may be determined depending on the average grain size of the end insulator layer or dielectric layer. Usually, however, powders having an average particle size of the order of 0.3 to 1.0 μm should be used.

The organic vehicle is provided by dissolving a binder in an organic solvent. No particular limitation is imposed on the binder used for the organic vehicle; an appropriate selection may be made from a variety of ordinary binders such as ethyl cellulose. No particular limitation is again imposed on the organic solvent used; an appropriate selection may be made from various organic solvents such as terpineol, butyl carbitol, acetone, and toluene depending on the process used such as a printing or sheet-making process.

The paste for the internal conductor is prepared by milling the aforesaid various conductive metals or alloys, or various oxides, organic metal compounds, resinates or the like converted into the aforesaid conductive materials after firing together with the aforesaid organic vehicle.

No particular limitation is imposed on the content of the organic vehicle in each of the aforesaid pastes; each paste may contain the organic vehicle in an ordinary amount. For instance, it is preferable that the amount of the binder is of the order of 1 to 5 wt % and the amount of the solvent is of the order of 10 to 50 wt %. If required, each paste may contain an additive selected from various dispersants, plasticizers, insulators, etc. Preferably in this case, the total amount of these additives should be up to 10 wt %.

When the resistor chip is obtained by the sheet-making process, the paste for the insulator layer is first used to form a green sheet. Such green sheets are stacked one upon another to a given thickness, and the paste for the internal conductor is printed on the laminate. Then, a laminate comprising green sheets stacked one upon another to a given thickness is provided on the printed paste. When the mutlilayer ceramic capacitor is obtained by the sheet-making process, the paste for the dielectric layer is used to form a green sheet. Several such green sheets are stacked one upon another, and the paste for the internal electrode is printed on the laminate. Then, a green sheet is stacked on the printed paste. In this way, sheets each with the internal electrode printed thereon and green sheets are alternately stacked one upon another. Finally, a given number of green sheets are stacked on the laminate. The resulting laminate is thermocompressed, and then cut into given shape to obtain a green chip. To bring conduction of the internal conductor in the resistor chip nearer to perfection, it is acceptable to stack alternately insulator sheets and sheets each with the internal conductor formed thereon.

Prior to firing, the binder is removed under ordinary conditions. When base metals such as Ni, and Ni alloys are used for the conductive material for the internal conductor, the binder should preferably be removed under the following conditions:

Heating rate: 5 to 300° C./hour, esp., 10 to 100° C./hour
Holding temperature: 200 to 400° C., esp., 250 to 300° C.
Temperature holding time: 0.5 to 24 hours, esp., 5 to 20 hours
Atmosphere: air The atmosphere for firing the green chip may be appropriately determined depending on the type of the conductive material in the internal conductor paste. When a base material such as Ni or an Ni alloy is used as the conductive material, however, it is preferable that a gaseous mixture containing $N_2$ as a main component and further containing 1 to 10% of $H_2$ together with $H_2O$ gas obtained by a water vapor pressure at 10 to 35° C. is used for the firing atmosphere. It is then preferable that the oxygen partial pressure is in the range of $10^{-8}$ to $10^{-12}$ atm. When the oxygen partial pressure is below the lower pressure, the conductive material of the internal conductor is abnormally sintered, resulting often in a break in the internal conductor. When the oxygen partial pressure exceeds the upper pressure, the internal conductor is susceptible to oxidation.

The hold temperature for firing should preferably be in the range of 1,100 to 1,400° C., and especially 1,200 to 1,300° C. When the holding temperature is below the lower limit, poor densification occurs, and at a holding temperature exceeding the upper limit, the internal electrode is likely to break down. The temperature holding time for firing should preferably be in the range of 0.5 to 8 hours, and especially 1 to 3 hours.

When firing is carried out in a reducing atmosphere, it is preferable to anneal the chip resistor or capacitor chip. Annealing is carried out to re-oxidize the insulator layer, thereby extending IR accelerated life considerably.

Preferably, the partial pressure of oxygen in the annealing atmosphere should be at least $10^{-6}$ atm., and especially $10^{-6}$ to $10^{-8}$ atm. At an oxygen partial pressure below the lower limit, it is difficult to re-oxidize the insulator layer or dielectric layer, and at an oxygen partial pressure exceeding the upper limit, the internal conductor is susceptible to oxidation.

Preferably, the holding temperature for annealing should be equal to or lower than 1,100° C., and especially 500 to 1,000° C. When the holding temperature is below the lower limit, the oxidation of the insulator layer or dielectric layer tends to become insufficient, resulting in life losses, and when the holding temperature exceeds the upper limit, the oxidation of the internal conductor takes place, resulting in decreases of current capacity, and capacitor capacity. In addition, the internal conductor reacts with the insulator material or dielectric material, again resulting in life losses.

It is here understood that the annealing step may comprise only a heating step and a cooling step. In this case, the temperature holding time is zero, and the holding temperature is tantamount to the maximum temperature. Preferably, the temperature holding time should be 0 to 20 hours, and especially 2 to 10 hours. For the atmospheric gas, it is preferable to use moisturized $H_2$ gas, etc.

It is also understood that at the aforesaid binder removal, firing, and annealing steps, a wetter or the like may be used to moisturize $N_2$ gas, $H_2$ gas, mixed gas, etc. Preferably in this case, the temperature of water should be of the order of 5 to 75° C.

The binder removal, firing, and annealing steps may be carried out successively or independently.

When these steps are carried out successively, it is preferable that after binder removal, the atmosphere is altered with no cooling. Then, the temperature is brought up to the holding temperature for firing, at which firing is carried out. Then, cooling is done, and when the holding temperature for annealing is reached, the atmosphere is altered to the annealing atmosphere in which annealing is carried out.

When these steps are carried out independently, at the binder removal step the temperature is brought up to a given holding temperature, which is held for a given time, and then brought down to room temperature. In this case, the atmosphere for binder removal should be the same as that used in the above successive process. At the annealing step the temperature is brought up to a given holding temperature, which is held for a given time, and then brought down to room temperature. In this case, the annealing atmosphere should be the same as that used in the above successive process. It is also acceptable that the binder removal and firing steps are successively carried out and only the annealing step is carried out independently or only the binder removal step is carried out independently and the firing and annealing steps are successively carried out.

Next, how to form the metal layers and the intermediate oxide layer is explained.

The metal particles oxidized by firing in an oxidizing atmosphere are dispersed, with glass frit if required, in a vehicle to obtain a paste for the first metal layer.

The metal particles that are not oxidized even upon firing in the above oxidizing atmosphere are dispersed, with glass frit if required, in a vehicle to obtain a paste for the second metal layer.

The paste for the first metal layer is coated by a dipping process on the chip member obtained as mentioned above, and then dried. Although no particular limitation is imposed on drying conditions, it is understood that drying should usually be carried out at about 50 to 200° C. for about 0 to 1 hour.

The thus coated paste for the first metal layer is baked (by firing) to the chip member. Preferably, firing should be carried out at about 600 to 1,000° C. for about 0 to 1 hour in a neutral $N_2$ gas atmosphere or a reducing mixed gas atmosphere comprising $N_2+H_2$.

After the precursor to the first electrode layer is formed as mentioned above, the paste for the second metal layer is formed by coating under the same conditions as in the case of the paste for the first electrode layer.

After the paste for the second metal layer is formed by coating as mentioned above, it is fired at about 400 to 900° C. for about 0 to 1 hour in an oxidizing atmosphere, e.g., in the air. In this firing process, only the surface layer of the precursor to the first metal layer is oxidized, so that a uniform intermediate oxide layer comprising an oxide of the metal contained in the first metal layer is formed between the first metal layer and the second metal layer. Preferably in this case, the metal particles contained in the second metal layer should be dispersed in the intermediate oxide layer.

Further, the chip member with the metal layers, etc. formed thereon may be dipped or otherwise put in a nickel plating bath, a tin solder plating bath or a tin-lead alloy solder plating bath to form a plated layer comprising a nickel layer/tin or tin-lead alloy layer. By the provision of the plated layer it is possible to improve resistance to solder attack, and solderability. Although no particular restriction is imposed on the thickness of the nickel layer/tin or tin-lead alloy layer, it is understood that each layer should usually be of the order of 1 to 20 $\mu$m.

FIG. 1 shows one exemplary structure of a CR composite electronic part which is fabricated as mentioned above and according to the invention. In FIG. 1, the RC composite electronic part comprises a dielectric layer 2, an internal electrode layer 3, a first metal layer 4, an intermediate oxide layer 5, and a second metal layer 6. Preferably in this case, terminal electrodes constructed of the first metal layer 4, second metal layer 6 and intermediate oxide layer 5 should be each provided on the outside with a plated layer. It is understood that the intermediate oxide layer 5 has a resistance value determined depending on conductivity restricted by the minimum thickness, metal oxides, etc.

In the embodiment shown in FIG. 1, the intermediate oxide layer 5 is formed on both terminals of the RC composite electronic part. However, the intermediate oxide layer may be formed on one terminal alone. In this case, only one of the terminal electrodes contributes to equivalent series resistance. In an ordinary process, however, the intermediate oxide layer is formed on both terminals.

Figure 2:
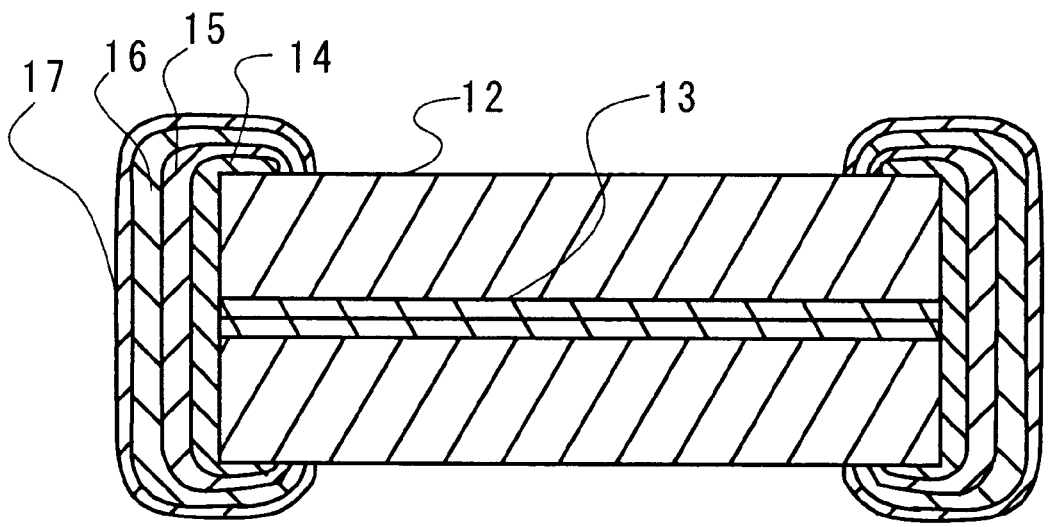
FIG. 2 is a sectional schematic depicting the basic construction of a chip resistor to which the invention is applied.

FIG. 2 shows one exemplary structure of a chip resistor which is fabricated as mentioned above and according to the invention. In FIG. 2, the chip resistor comprises an insulator layer 12, an internal conductor 13, a first metal layer 14, an intermediate oxide layer 15, and a second metal layer 16. Preferably in this case, terminal electrodes constructed of the first metal layer, second metal layer and intermediate oxide layer should be each provided on the outside with a plated layer 17.

EXAMPLE

The present invention is explained more illustratively with reference to examples.

Example 1

Dielectric Layer $BaCO_3$ (having an average particle size of 2.0 $\mu$m) and $TiO_2$ (having an average particle size of 2.0 $\mu$m) were provided as the main raw material for a dielectric layer. The atomic ratio of Ba/Ti was 1.00. Further, additives $MnCO_3$, $MgCO_3$, $Y_2O_3$, and $(BaCa)SiO_3$ were provided in the respective amounts of 0.2 wt %, 0.2 wt %, 2.1 wt %, and 2.2 wt % relative to $BaTiO_3$. These raw powders were mixed together in an underwater ball mill, and dried. The obtained powder mixture was calcined at 1,250° C. for 2 hours. The calcined product was pulverized in an underwater ball mill, and dried. The obtained calcined powders were mixed with an acrylic resin serving as an organic binder, and methylene chloride and acetone serving as organic solvents to prepare a dielectric slurry. The obtained dielectric slurry was formed by a doctor blade process into a dielectric green sheet.

Internal Electrode

Powders (having an average particle size of 0.8 $\mu$m) of base metal Ni were provided as an internal electrode material. The powders were then milled in a triple roll mill with ethyl cellulose serving as an organic binder and terpineol serving as an organic solvent to prepare a paste for the internal electrode.

Paste for the First Metal Layer

Cu powders (having an average particle size of 0.5 $\mu$m), and Cu powders with 7 wt % of strontium base glass added thereto were provided as a paste material for the first metal layer. The powders were milled with an acrylic resin serving as an organic binder and terpineol serving as an organic solvent in a triple roll mill to prepare a paste for each terminal electrode.

Paste for the Second Metal Layer

Ag powders (having an average particle size of 0.5 $\mu$m), and Ag powders with 1 wt % of lead borosilicate glass added thereto were provided as a paste material for the second metal layer. The powders were milled with an acrylic resin serving as an organic binder and terpineol serving as an organic solvent in a triple roll mill to prepare a paste for each terminal electrode.

Preparation of RC Device

Several green sheets were stacked one upon another to obtain a given thickness. Stacked on the laminate were a given number of green sheets printed by a screen printing process in such a manner that ends of the paste for the internal electrode were exposed to the outside alternately from ends of the paste of the dielectric layer. Finally, a given number of green sheets, each with no internal electrode printed thereon, were stacked on the laminate. Then, the resultant laminate was thermocompressed, and cut in such a way that 3.2×1.6×1.0 mm green chip size was obtained after firing, thereby obtaining a green chip.

The thus obtained green chip was left in the air at 80° C. for 30 minutes for drying. Then, the green chip was fired by holding it at 1,300° C. for 3 hours in a moisturized $N_2+H_2$ ($H_2$: 3%) reducing atmosphere. Further, the green chip was held at 1,000° C. for 2 hours in a moisturized $H_2$ atmosphere having an oxygen partial pressure of $10^{-7}$ atm., thereby obtaining a chip member.

The paste for the first metal layer obtained by dispersing Cu with glass frit added thereto in an amount of 7 wt % relative to the metal component in an organic vehicle was coated on both ends of the obtained chip member, dried, and held at 770° C. for 10 minutes in an $N_2+H_2$ atmosphere for firing, thereby forming the first metal layer.

Then, the paste for the second metal layer obtained by dispersing Ag with glass frit added thereto in an amount of 1 wt % relative to the metal component in an organic vehicle was coated by a dipping process on both ends of the chip member with the first metal layer formed thereof, dried, and held at 600 to 750° C. for 10 minutes in the air for firing, thereby forming the second metal layer and, at the same time, oxidizing the surface of the first metal layer to form an intermediate oxide layer. At this time, firing was carried out at temperatures of 600° C., 650° C., 700° C., and 750° C. for holding times of 1 minute, 5 minutes, and 10 minutes for the purpose of controlling the thickness of the second metal layer. X-ray diffraction analysis of the second metal layer indicated the presence of $Cu_2O$, $Cu_3O_4$, and CuO.

Then, a nickel plating layer, and a tin-lead alloy plating layer were successively formed by an electrolytic process on each of the obtained samples having such additive compositions as mentioned above to obtain a CR composite electronic part sample which was found to have an electrostatic capacity of 22 $\mu$F. Each of the obtained samples was also measured for ESR. The results are plotted in FIG. 3. A photograph taken of a section of an end portion of one sample obtained by firing at 650° C. for the holding time of 10 minutes is attached hereto as FIG. 4, and an enlarged photograph of FIG. 4 is attached hereto as FIG. 5.

Figure 4:
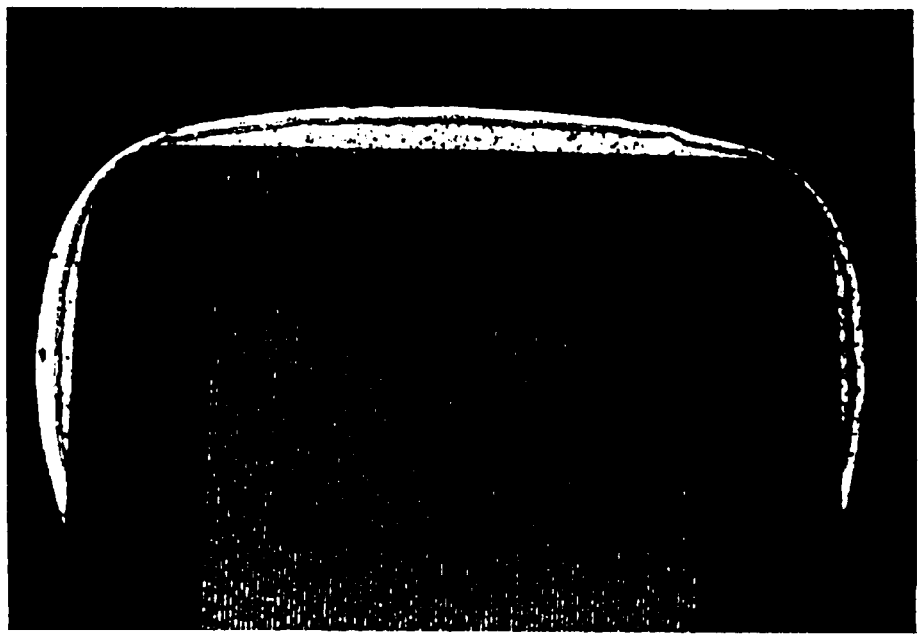
FIG. 4 is a photograph taken of a section of a terminal electrode portion of an RC composite electronic part according to the invention.
Figure 5:
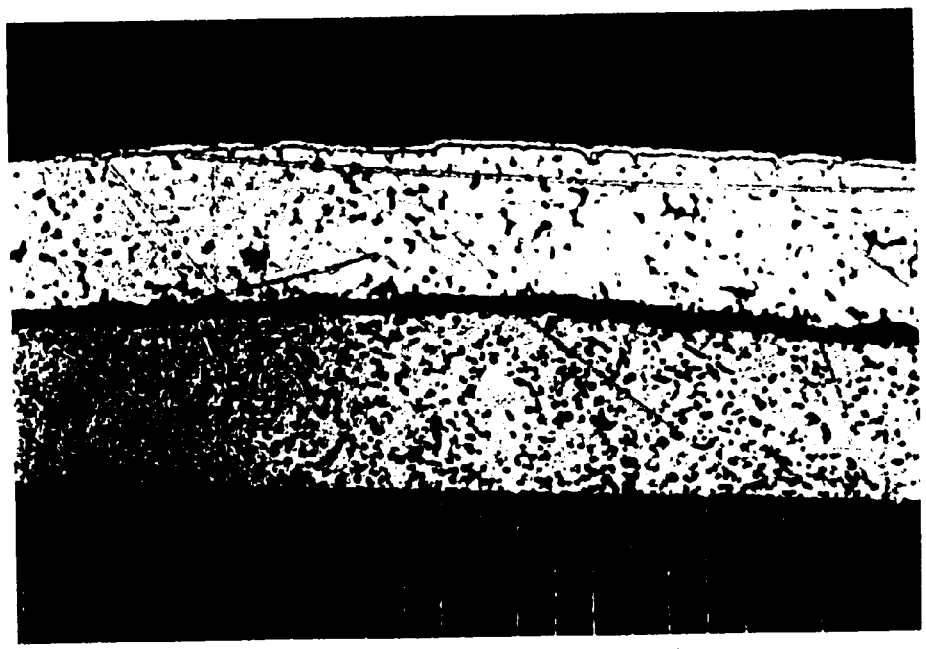
FIG. 5 is an enlarged photograph of FIG. 4.

As can be seen from FIGS. 4 and 5, the intermediate oxide layer (represented by a dark strip region in the vicinity of a middle portion of the terminal electrode) is formed between the first metal layer and the second metal layer. Further, the obtained RC composite electronic part was operated as a power supply bypass capacitor for a DC-DC converter at a varying switching frequency between 1 kHz and 10 MHz. As a consequence, it was found that the CR composite electronic part can function normally without causing voltage fluctuations such as oscillation.

A sample was prepared as in Example 1 with the exception that a green chip of 4.5×3.2×2.0 mm was used. With this sample, it was found that the stability of the circuit can be further enhanced.

Figure 3:
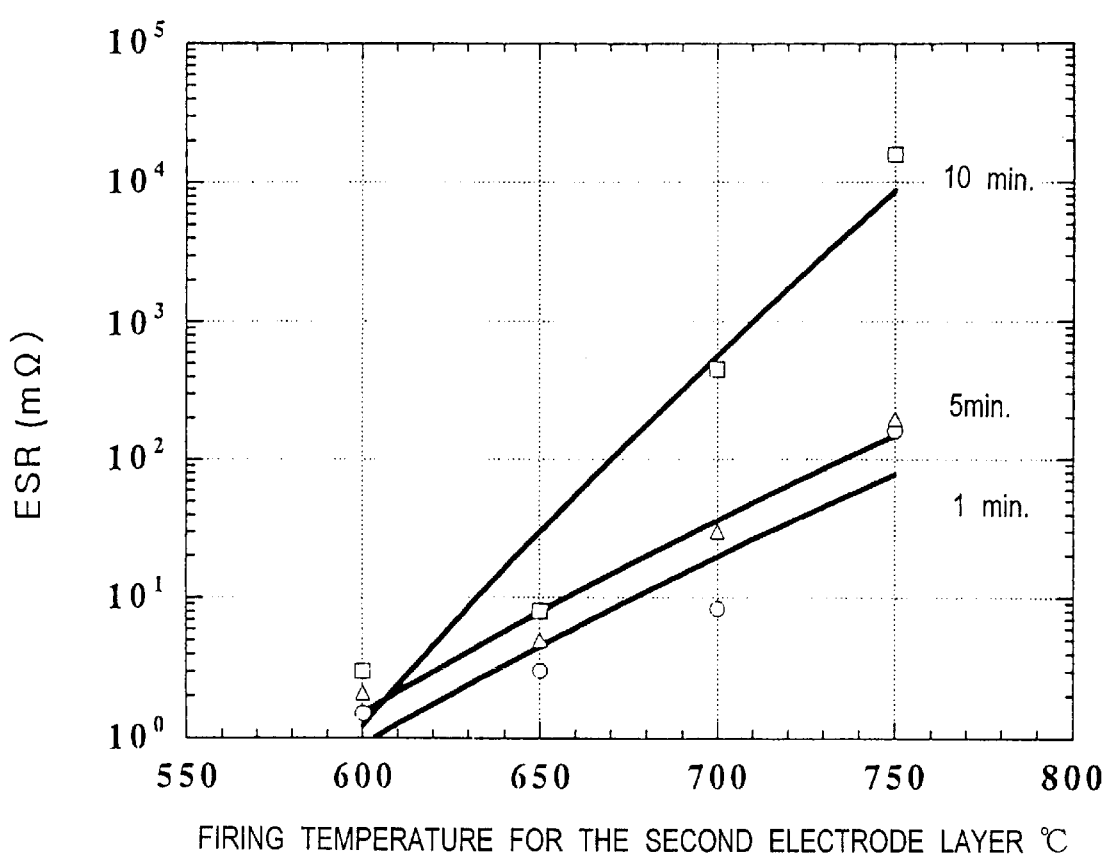
FIG. 3 is a graph showing the ESR of an RC composite electronic part sample according to the invention.

As can be seen from FIG. 3, the ESR can be varied or controlled by varying the firing temperature and holding time for firing the second metal layer.

Example 2

Samples were obtained as in Example 1 with the exception that as the material for the first metal layer, Ni powders (having an average particle size of 0.4 $\mu$m), Ni—Cu powders (having an average particle size of 0.5 $\mu$m), Fe powders (having an average particle size of 0.5 $\mu$m), and Co powders (having an average particle size of 0.01 to 10 $\mu$m) were used in place of the Cu powders.

Each of the obtained samples was measured for EST as in Example 1. As a result, it was found that substantially similar results are obtained although the ESR measurements are more or less different from those in Example 1.

Example 3

Samples were obtained as in Example 1 with the exception that Au powders (having an average particle size of 1.0 $\mu$m), Pt powders (having an average particle size of 0.1 to 5 $\mu$m), Pd powders (having an average particle size of 0.01 to 5 $\mu$m), Rh powders (having an average particle size of 0.1 to 10 $\mu$m), and Ir powders (having an average particle size of 0.1 to 10 $\mu$m) were used as the material for the second metal layer.

Each of the obtained samples was measured for EST as in Example 1. As a result, it was found that substantially similar results are obtained although the ESR measurements are more or less different from those in Example 1.

Example 4

In Example 1, Ni powders (having an average particle size of 0.5 $\mu$m) that were the metal for the first metal layer, and Ni powders with 7 wt % of strontium base glass added thereto were provided as the paste material for the first metal layer. The powders were milled with an acrylic resin serving as an organic binder and terpineol serving as an organic solvent in a triple roll mill to prepare a paste for each terminal electrode.

Pd powders (having an average particle size of 0.5 $\mu$m) that were the metal for the second metal layer, and Pd powders with 1 wt % of lead borosilicate glass added thereto were provided as the paste material for the second metal layer. The powders were milled with an acrylic resin serving as an organic binder and terpineol serving as an organic solvent in a triple roll mill to prepare a paste for each terminal electrode.

A green chip obtained as in Example 1 was left at 80° C. for 30 minutes in the air, and dried. Then, the green chip was held at 1,300° C. for 3 hours in a moisturized $N_2+H_2$ ($H_2$: 3%) reducing atmosphere for firing. Further, the green chip was held at 1,000° C. for 2 hours in a moisturized $H_2$ atmosphere having an oxygen partial pressure of $10^{-7}$ atm. to obtain a chip member.

The paste for the first metal layer was coated on both ends of the obtained chip member, dried, and fired at 1,000° C. for 10 minutes in a neutral or reducing atmosphere to obtain an Ni terminal electrode (a first electrode layer).

Then, the paste for the second metal layer was coated by a dipping process on the first metal layer, dried, and held at 800° C. for 1 minute in the air for firing, thereby completing the second metal layer and, at the same time, oxidizing the surface of the first metal layer to form an intermediate oxide layer. The presence of NiO was identified by x-ray diffraction analysis of the intermediate oxide layer.

Then, a nickel plating layer, and a tin-lead alloy plating layer were successively formed by an electrolytic process on each of the obtained samples having such additive compositions as mentioned above to obtain an RC composite electronic part sample which was found to have an electrostatic capacity of 1 μF. By measurement, each sample was found to have an ESR of 500 mΩ. When the metal in the paste for the second metal layer was changed from Pd to Pt, too, substantially equivalent results were obtained. Further, the obtained RC composite electronic part was operated as a power supply bypass capacitor for a DC-DC converter. As a consequence, it was found that the RC composite electronic part can function normally without causing voltage fluctuations such as oscillation. A sample was prepared as in Example 4 with the exception that a green chip of 4.5×3.2× 2.0 mm was used. By measurement, the sample was found to have an ESR of 1,000 mΩ. This sample was used as a bypass capacitor as mentioned above. It was consequently found that the stability of the circuit is further improved.

Example 5

In Example 4, the paste for the first metal layer was coated on both ends of the obtained green chip, and dried. At both ends of the green chip with the first metal layer coated thereon, the paste for the second metal layer was coated by a dipping process on the paste for the first metal layer, and dried.

The green chip with the terminal electrode pastes (for the first, and second metal layers) coated thereon was left at 80° C. for 30 minutes in the air for drying. Subsequently, the green chip was held at 1,300° C. for 3 hours in a moisturized $N_2+H_2$ ($H_2$: 3%) reducing atmosphere for firing, then held at 1,000° C. for 2 hours in a moisturized $H_2$ atmosphere having an oxygen partial pressure of $10^{-7}$ atm., and finally held at 700° C. for 10 minutes for cooling, thereby forming a chip member and, at the same time, completing the first, and second metal layers simultaneously with the oxidization of the surface of the first metal layer, thereby forming an intermediate oxide layer. The presence of NiO was identified by x-ray diffraction analysis of the intermediate oxide layer.

Then, a nickel plating layer, and a tin-lead alloy plating layer were successively formed by an electrolytic process on each of the obtained samples having such additive compositions as mentioned above to obtain an RC composite electronic part sample which was found to have an electrostatic capacity of 1 μF. By measurement, each sample was found to have an ESR of 200 mΩ. Further, the obtained CR composite electronic part was operated as a power supply bypass capacitor for a DC-DC converter. As a consequence, it was found that the RC composite electronic part can function normally without causing voltage fluctuations such as oscillation. A sample was prepared as in Example 5 with the exception that a green chip of 4.5×3.2×2.0 mm was used. By measurement, the sample was found to have an ESR of 900 mΩ. This sample was used as a bypass capacitor as mentioned above. It was consequently found that the stability of the circuit is further improved.

The foregoing examples are all directed to the application of the invention to a multilayer ceramic capacitor. However, the invention is in no sense limited to such a multilayer ceramic capacitor; the invention may find wide applications in inductors, semiconductors, and other composite electronic parts.

Example 6

Paste for the First Metal Layer

Cu powders (having an average particle size of 0.3 μm) were dispersed with 7 wt % of strontium base glass (having an average particle size of 0.5 μm) in a vehicle to obtain a paste for the first metal layer.

Paste for the Second Metal Layer

Ag powders (having an average particle size of 3.0 μm) were dispersed with 1 wt % of lead base glass (having an average particle size of 1.0 μm) in a vehicle to obtain a paste for the second metal layer.

Substrate

A commercially available 99.6% alumina substrate was used.

Preparation of Electronic Device

The paste for the first metal layer was printed on the substrate according to a given pattern by a screen printing process, dried, and fired at 770° C. for 10 minutes in an $N_2+H_2$ ($H_2$: 3%) mixed atmosphere, thereby forming a precursor to the first electrode layer. At this time, the paste for the first metal layer had a thickness of 20 μm. The paste for the second metal layer was printed on the sintered precursor to the first metal layer in such a way that the precursor to the first metal layer was perfectly covered thereby, dried, and fired at 650° C. for 10 minutes in the air. Thus, an electronic device was obtained, which comprised an intermediate oxide layer including an oxide of Cu contained in the precursor to the first metal layer, the first metal layer, and the second metal layer.

Figure 6:
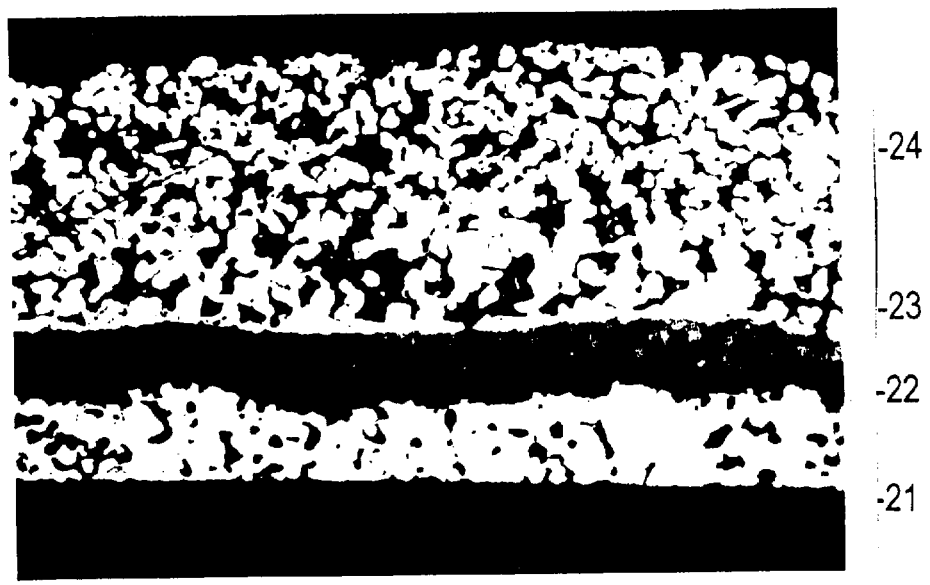
FIG. 6 is a photograph taken of a section of an electronic part according to the invention.

A photograph taken of a section of the obtained electronic device is attached hereto as FIG. 6. As can be seen from FIG. 6, a substrate 21 is provided thereon with a Cu metal layer 22 that is the first metal layer, a Cu oxide layer 23 that is the intermediate oxide layer, and an Ag metal layer 24 that is the second metal layer in the described order. By EPMA it was identified that oxygen is present in the Cu oxide layer 23, and by x-ray diffraction it was identified that the Cu oxide is $Cu_2O$.

Example 7

Paste for the First Metal Layer

Ni powders (having an average particle size of 0.2 μm) were dispersed with 7 wt % of strontium base glass (having an average particle size of 0.5 μm) in a vehicle to obtain a paste for the first metal layer.

Paste for the Second Metal Layer

Ag powders (having an average particle size of 3.0 μm) were dispersed with 1 wt % of lead base glass (having an average particle size of 1.0 μm) in a vehicle to obtain a paste for the second metal layer.

Substrate

A commercially available 99.6% alumina substrate was used.

Preparation of Electronic Device

The paste for the first metal layer was printed on the substrate according to a given pattern by a screen printing process, dried, and fired at 900° C. for 10 minutes in an $N_2+H_2$ ($H_2$: 3%) mixed atmosphere, thereby forming a precursor to the first electrode layer. At this time, the paste for the first metal layer had a thickness of 20 μm. The paste for the second metal layer was printed on the sintered precursor to the first metal layer in such a way that the precursor to the first metal layer was perfectly covered thereby, dried, and fired at 750° C. for 10 minutes in the air. Thus, an electronic device was obtained, which comprised an intermediate oxide layer including an oxide of Ni contained in the precursor to the first metal layer, the first metal layer, and the second metal layer.

Thus, the Ni oxide layer that was an intermediate oxide layer of 3 μm in thickness could be formed midway between the Ni metal layer that was the first metal layer and the Ag metal layer that was the second metal layer. By EPMA it was identified that oxygen is present in the Ni oxide layer, and by x-ray diffraction it was identified that the Ni oxide is NiO.

Example 8

Paste for the First Metal Layer

Mn powders (having an average particle size of 1.0 μm) were dispersed with 7 wt % of strontium base glass (having an average particle size of 0.5 μm) in a vehicle to obtain a paste for the first metal layer.

Paste for the Second Metal Layer

Pd powders (having an average particle size of 0.5 μm) were dispersed with 1 wt % of lead base glass (having an average particle size of 1.0 μm) in a vehicle to obtain a paste for the second metal layer.

Substrate

A commercially available 99.6% alumina substrate was used.

Preparation of Electronic Device

The paste for the first metal layer was printed on the substrate according to a given pattern by a screen printing process, dried, and fired at 900° C. for 10 minutes in an $N_2+H_2$ ($H_2$: 3%) mixed atmosphere, thereby forming a precursor to the first electrode layer. At this time, the paste for the first metal layer had a thickness of 20 μm. The paste for the second metal layer was printed on the sintered precursor to the first metal layer in such a way that the precursor to the first metal layer was perfectly covered thereby, dried, and fired at 800° C. for 10 minutes in the air. Thus, an electronic device was obtained, which comprised an intermediate oxide layer including an oxide of Mn contained in the precursor to the first metal layer, the first metal layer, and the second metal layer.

Thus, the Mn oxide layer that was an intermediate oxide layer of 10 μm in thickness could be formed midway between the Mn metal layer that was the first metal layer and the Pd metal layer that was the second metal layer. By EPMA it was identified that oxygen is present in the Mn oxide layer, and by x-ray diffraction it was identified that the Mn oxide is MnO.

Example 9

Paste for Primer Metal Layer

Cu powders (having an average particle size of 0.3 μm) were dispersed with 7 wt % of strontium base glass (having an average particle size of 0.5 μm) in a vehicle to obtain a paste for the first metal layer.

Paste for the Second Metal Layer

Ag powders (having an average particle size of 3.0 μm) were dispersed with 1 wt % of lead base glass (having an average particle size of 1.0 μm) in a vehicle to obtain a paste for the second metal layer.

Substrate

A commercially available 99.6% alumina substrate was used.

Preparation of Electronic Device

The paste for the primer metal layer was printed on the substrate according to a given pattern by a screen printing process, dried, and fired at 770° C. for 10 minutes in an $N_2+H_2$ ($H_2$: 3%) mixed atmosphere, thereby forming a primer metal layer. At this time, the paste for the primer metal layer had a thickness of 20 μm. A 5-μm thick Ni film that was a plating layer providing the first metal layer was then formed by a known electrolytic plating process on the sintered primer metal layer. Further, the paste for the second metal layer was printed on the first metal layer in such a way that the first metal layer was perfectly covered thereby, dried, and fired at 700° C. for 10 minutes in the air. Thus, an electronic device was obtained, which comprised an intermediate oxide layer including an oxide of Ni contained in the first metal layer, the primer metal layer, the first metal layer, and the second metal layer.

Thus, the Ni oxide layer that was a 10-μm thick intermediate oxide layer could be formed on the Cu metal layer that was the primer metal layer midway between the Ni metal layer that was the first metal layer and the Ag metal layer that was the second metal layer. By EPMA it was identified that oxygen is present in the Ni oxide layer, and by x-ray diffraction it was identified that the Ni oxide is NiO.

Example 10

In this example, a resistor chip was prepared to explain an application example of the electronic device according to the invention.

Insulator Layer $BaCO_3$ (having an average particle size of 2.0 μm) and $TiO_2$ (having an average particle size of 2.0 μm) were provided as the main raw material for an insulator layer. The atomic ratio of Ba/Ti was 1.00. Further, additives $MnCO_3$, $MgCO_3$, $Y_2O_3$, and $(BaCa)SiO_3$ were provided in the respective amounts of 0.2 wt %, 0.2 wt %, 2.1 wt %, and 2.2 wt % relative to $BaTiO_3$. These raw powders were mixed together in an underwater ball mill, and dried. The obtained powder mixture was calcined at 1,250° C. for 2 hours. The calcined product was pulverized in an underwater ball mill, and dried. The obtained calcined powders were mixed with an acrylic resin serving as an organic binder, and methylene chloride and acetone serving as organic solvents to prepare an insulator slurry. The obtained insulator slurry was formed by a doctor blade process into an insulator green sheet.

Internal Conductor

Powders (having an average particle size of 0.8 μm) of base metal Ni were provided as an internal conductor material. The powders were then milled in a triple roll mill with ethyl cellulose serving as an organic binder and terpineol serving as an organic solvent to prepare a paste for the internal conductor.

Paste for the First Metal Layer

Cu powders (having an average particle size of 0.5 μm), and Cu powders with 7 wt % of strontium base glass added thereto were provided as a paste material for the first metal layer. The powders were milled with an acrylic resin serving as an organic binder and terpineol serving as an organic solvent in a triple roll mill to prepare a paste for the first metal layer.

Paste for the Second Metal Layer

Ag powders (having an average particle size of 0.5 μm) were provided as a paste material for the second metal layer. The powders were milled with an acrylic resin serving as an organic binder and terpineol serving as an organic solvent in a triple roll mill to prepare a paste for the second metal layer.

Preparation of Resistor Chip

Several green sheets were stacked one upon another to obtain a given thickness. Printed on the laminate was the internal conductor paste by a screen printing process. Finally, a given number of green sheets were stacked on the laminate. Then, the resultant laminate was thermocompressed, and cut in such a way that 3.2×1.6×1.0 mm green chip size was obtained after firing, thereby obtaining a green chip.

The thus obtained green chip was left in the air at 80° C. for 30 minutes for drying. Then, the green chip was fired by holding it at 1,300° C. for 3 hours in a moisturized $N_2+H_2$ ($H_2$: 3%) reducing atmosphere. Further, the green chip was held at 1,000° C. for 2 hours in a moisturized $H_2$ atmosphere having an oxygen partial pressure, of $10^{-7}$ atm., thereby obtaining a chip member.

The paste for the first metal layer was coated on both ends of the obtained chip member, dried, and held at 770° C. for 10 minutes in an $N_2+H_2$ ($H_2$: 4%) atmosphere for firing, thereby forming a precursor (Cu-containing layer) to the first metal layer.

Then, the Ag-containing paste for the second metal layer was coated by a dipping process on both ends of the chip member on which the precursor to the first metal layer was formed, dried, and held at 620° C. for 10 minutes in the air, thereby completing the second metal layer and, at the same time, oxidizing the surface of the precursor to the first metal layer to form an intermediate oxide layer containing copper oxide having a relatively high resistance. In this case, there was a decrease in the effective resistance film thickness with a resistance value lower than that of an intermediate oxide layer formed solely of copper oxide, because the silver particles contained in the second metal layer were dispersed in a layer form in the intermediate oxide layer.

Figure 7:
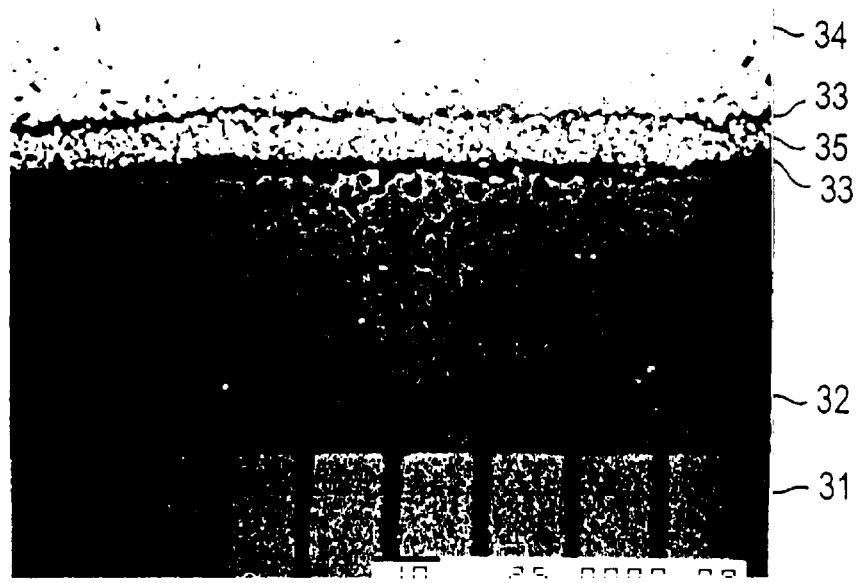
FIG. 7 is a photograph taken of a section of a chip resistor to which the invention is applied.

An end of the obtained chip resistor was observed after cutting. A photograph taken of a section of the cut chip resistor is attached hereto as FIG. 7. As can be seen from FIG. 7, a chip member 31 is successively provided thereon with a first metal layer 32 containing copper, an intermediate oxide layer 33 containing copper oxide, and a second metal layer 34 containing silver, each in a layer form. The metal (Ag) 35 in the second metal layer is diffused into the intermediate oxide layer 33. At this time, the first metal layer had a thickness of about 50 μm, the intermediate oxide layer had a thickness of about 10 μm, and the second metal layer had a thickness of about 20 μm. The presence of oxygen was identified by EPMA analysis of the intermediate oxide layer, and the presence of $Cu_2O$, $Cu_3O_4$, and $CuO$ was identified by x-ray diffraction analysis of the intermediate oxide layer. Here, the degree of diffusion of Ag in the intermediate oxide layer is represented by the ratio of the average thickness of the intermediate oxide layer 33 with respect to the average thickness of the Ag layer 35 in the intermediate oxide layer.

It is understood that the average thickness of each layer was found by SEM section observation. In the following table, the above degree is shown by the ratio of the Ag diffused layer.

Then, a nickel plating layer, and a tin-lead alloy plating layer were successively formed by an electrolytic process on each of the obtained samples having such additive compositions as mentioned above. Lead wires were soldered to both terminals of each sample. While the chip member with lead wires soldered thereto was set on a weighted tester, it was pulled in a vertical direction to measure tensile strength at the instant when the terminals broken down. The resistance of each sample was also measured. The results are shown in Table 1.

Example 11

A sample was prepared and estimated as in Example 10 with the exception that the average particle size of the Ag powders in the second metal layer was changed to 3.0 μm. The results are shown in Table 1.

Example 12

A sample was prepared and estimated as in Example 10 with the exception that the average particle size of the Ag powders in the second metal layer was changed to 5.0 μm. The results are shown in Table 1.

Example 13

A sample was prepared and estimated as in Example 10 with the exception that the average particle size of the Ag powders in the second metal layer was changed to 9.0 μm. The results are shown in Table 1.

Comparative Example 1

A sample was prepared and estimated as in Example 10 with the exception that the average particle size of the Ag powders in the second metal layer was changed to 12.0 μm.

The results are shown in Table 1.

Example 14

A sample was prepared and estimated as in Example 10 with the exception that 1 wt % of PbO—$B_2O_3$—$Ti_2O_3$ base glass frit (having a softening point of 303° C.) was added to the paste for the second metal layer. The results are shown in Table 1.

Example 15

A sample was prepared and estimated as in Example 10 with the exception that 1 wt % of PbO—$B_2O_3$—$SiO_2$ base glass frit (having a softening point of 470° C.) was added to the paste for the second metal layer. The results are shown in Table 1.

Example 16

A sample was prepared and estimated as in Example 10 with the exception that 1 wt % of ZnO—$B_2O_3$—$SiO_2$ base glass frit (having a softening point of 610° C.) was added to the paste for the second metal layer. The results are shown in Table 1.

TABLE 1

| Sample No. | Ag particle size (μm) | Glass | Ratio of Ag in oxidized layer | Resistance (Ω) | Tensile strength (kg) |
|---|---|---|---|---|---|
| Ex. 10 | 0.5 | — | 0.95 | 0.03 | 3.0 |
| Ex. 11 | 3 | — | 0.8 | 0.1 | 3.0 |
| Ex. 12 | 5 | — | 0.5 | 0.24 | 3.1 |
| Ex. 13 | 9 | — | 0.1 | 0.66 | 3.0 |
| Comp. Ex. 1 | 12 | — | 0 | 0.74 | 1.1 |
| Ex. 14 | 0.5 | PbO—$B_2O_3$—$Tl_2O_3$ | 0.2 | 0.61 | 3.0 |
| Ex. 15 | 0.5 | PbO—$B_2O_3$—$SiO_2$ | 0.97 | 0.02 | 3.1 |
| Ex. 16 | 0.5 | ZnO—$B_2O_3$—$SiO_2$ | 0.1 | 0.7 | 2.9 |

As can be seen from Table 1, the inventive samples enable even a relatively low resistance to be easily obtained, and have a sufficient value for tensile strength at terminals. While the correlation between the ratio of the Ag diffused layer and the resistance value may be learned from Table 1 to some extents, it is noted that it is difficult to have a full understanding of the ratio of diffusion of Ag based on the above method. In other words, the values given as the ratio of Ag in the oxidized layer in Table 1 are nothing else than an index to the amount of Ag present in the layer.

Example 17

Samples were prepared, and estimated as in Examples 10 to 16 with the exception that Cu contained in the first metal layer, and Ag contained in the second metal layer were changed to Ni, and Pd, respectively. Substantially similar results were obtained although resistance values, etc. varied slightly due to the use of different metals.

Example 18

Next, a multilayered chip capacitor was prepared to explain another application example of the electronic device according to the invention.

Dielectric Layer $BaCO_3$ (having an average particle size of 2.0 μm) and $TiO_2$ (having an average particle size of 2.0 μm) were provided as the main raw material for a dielectric layer. The atomic ratio of Ba/Ti was 1.00. Further, additives $MnCO_3$, $MgCO_3$, $Y_2O_3$, and $(BaCa)SiO_3$ were provided in the respective amounts of 0.2 wt %, 0.2 wt %, 2.1 wt %, and 2.2 wt % relative to $BaTiO_3$. These raw powders were mixed together in an underwater ball mill, and dried. The obtained powder mixture was calcined at 1,250° C. for 2 hours. The calcined product was pulverized in an underwater ball mill, and dried. The obtained calcined powders were mixed with an acrylic resin serving as an organic binder, and methylene chloride and acetone serving as organic solvents to prepare a dielectric slurry. The obtained dielectric slurry was formed by a doctor blade process into a dielectric green sheet.

Internal Conductor

Powders (having an average particle size of 0.8 μm) of base metal Ni were provided as an internal conductor material. The powders were then milled in a triple roll mill with ethyl cellulose serving as an organic binder and terpineol serving as an organic solvent to prepare a paste for the internal conductor.

Paste for the First Metal Layer

Cu powders (having an average particle size of 0.5 μm), and Cu powders with 7 wt % of strontium base glass added thereto were provided as a paste material for the first metal layer. The powders were milled with an acrylic resin serving as an organic binder and terpineol serving as an organic solvent in a triple roll mill to prepare a paste for the first metal layer.

Paste for the Second Metal Layer

Ag powders (having an average particle size of 0.5 μm) with 1 wt % of lead borosilicate glass added thereto were provided as a paste material for the second metal layer. The powders were milled with an acrylic resin serving as an organic binder and terpineol serving as an organic solvent in a triple roll mill to prepare a paste for the second metal layer.

Preparation of Capacitor Chip

Several green sheets were stacked one upon another to obtain a given thickness. Printed on the laminate was the internal conductor paste by a screen printing process. Then, a green sheet was stacked on the printed laminate. In this way, sheets each with the internal electrode printed thereon and green sheets were alternately stacked one upon another. Finally, a given number of green sheets were stacked on the laminate. Then, the resultant laminate was thermocompressed, and cut in such a way that 3.2×1.6×1.0 mm green chip size was obtained after firing, thereby obtaining a green chip.

The thus obtained green chip was left in the air at 80° C. for 30 minutes for drying. Then, the green chip was fired by holding it at 1,300° C. for 3 hours in a moisturized $N_2+H_2$ ($H_2$: 3%) reducing atmosphere. Further, the green chip was held at 1,000° C. for 2 hours in a moisturized $H_2$ atmosphere having an oxygen partial pressure of $10^{-7}$ atm., thereby obtaining a chip member.

The paste for the first metal layer was coated on both ends of the obtained chip member, dried, and held at 770° C. for 10 minutes in an $N_2+H_2$ ($H_2$: 4%) atmosphere for firing, thereby forming a precursor (Cu-containing layer) to the first metal layer.

Then, the Ag-containing paste for the second metal layer was coated by a dipping process on both ends of the chip member on which the precursor to the first metal layer was formed, dried, heated at a heating rate of 1,800° C./h (sample 1), 2,400° C./h (sample 2), and 3,000° C/h (sample 3), and held at 650° C. for 10 minutes in the air, thereby completing the second metal layer and, at the same time, oxidizing the surface of the precursor to the first metal layer to form an intermediate oxide layer containing copper oxide having a relatively high resistance. In this case, the silver particles contained in the second metal layer were dispersed in the intermediate oxide layer to form a path. The effective resistance value depended on the path formed by the Ag particles diffused into the intermediate oxide layer, and became low.

Figure 8:
FIG. 8 is a photograph taken of a section of a chip capacitor resistor to which the invention is applied.
Figure 9:
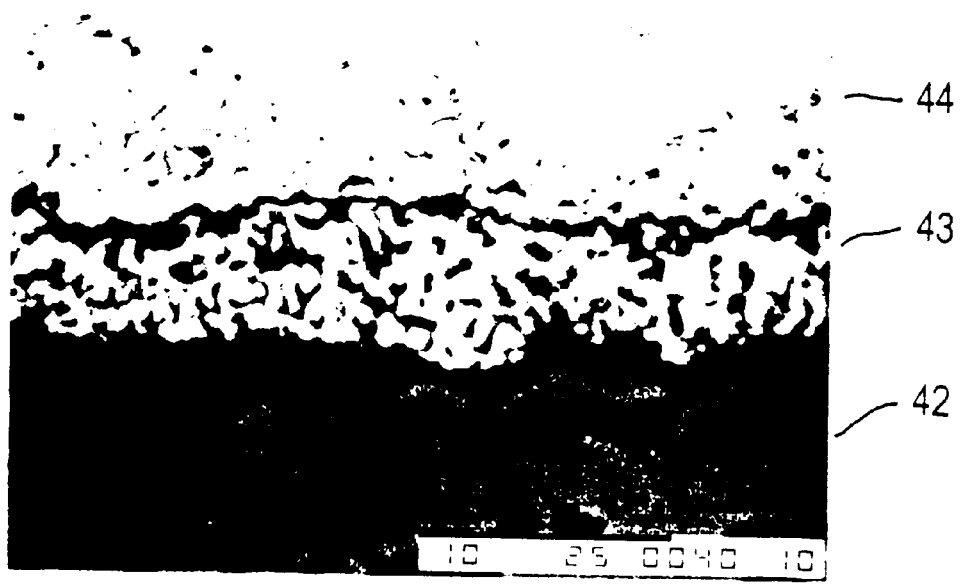
FIG. 9 is a photograph taken of a section of a chip capacitor to which the invention is applied.
Figure 10:
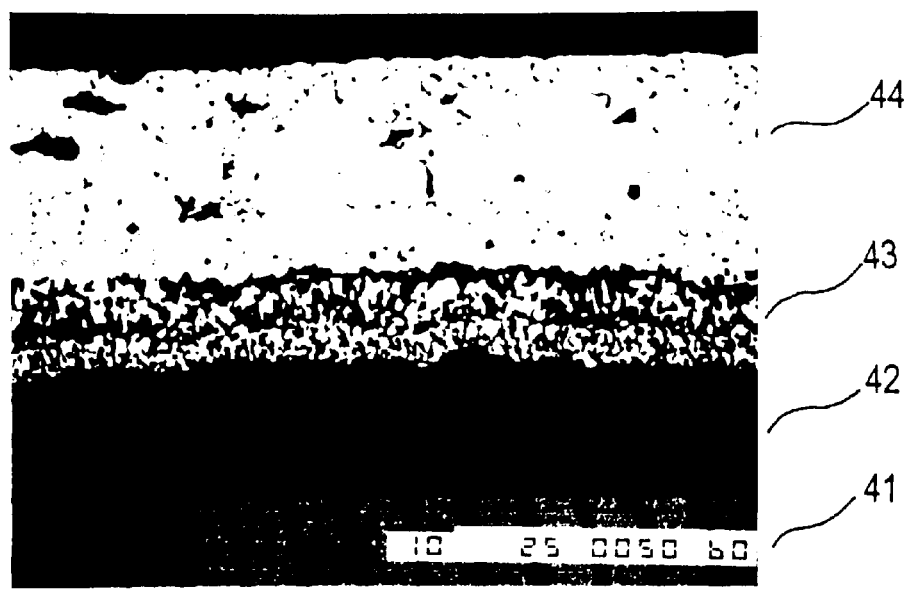
FIG. 10 is a photograph taken of a section of a chip capacitor to which the invention is applied.
Figure 11:
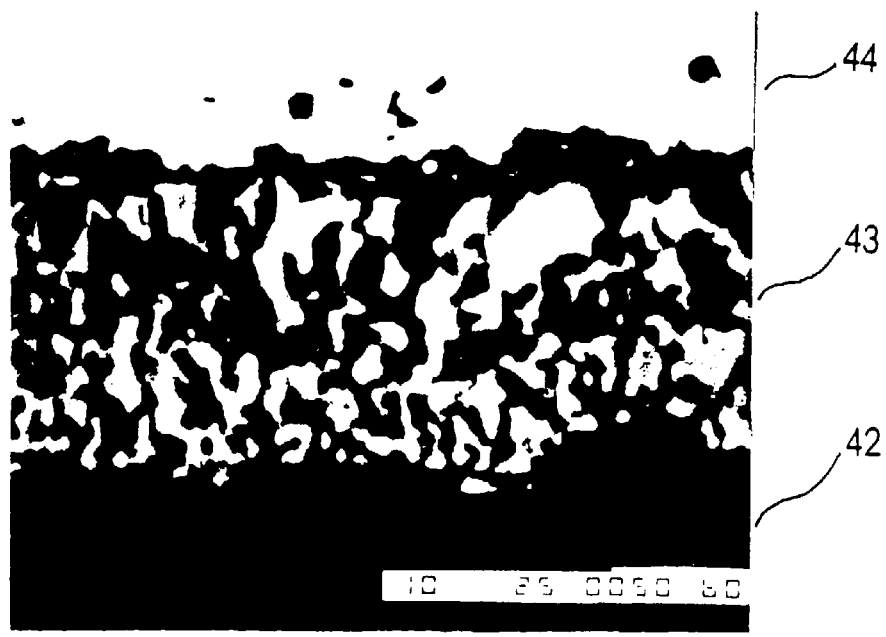
FIG. 11 is a photograph taken of a section of a chip capacitor to which the invention is applied.
Figure 12:
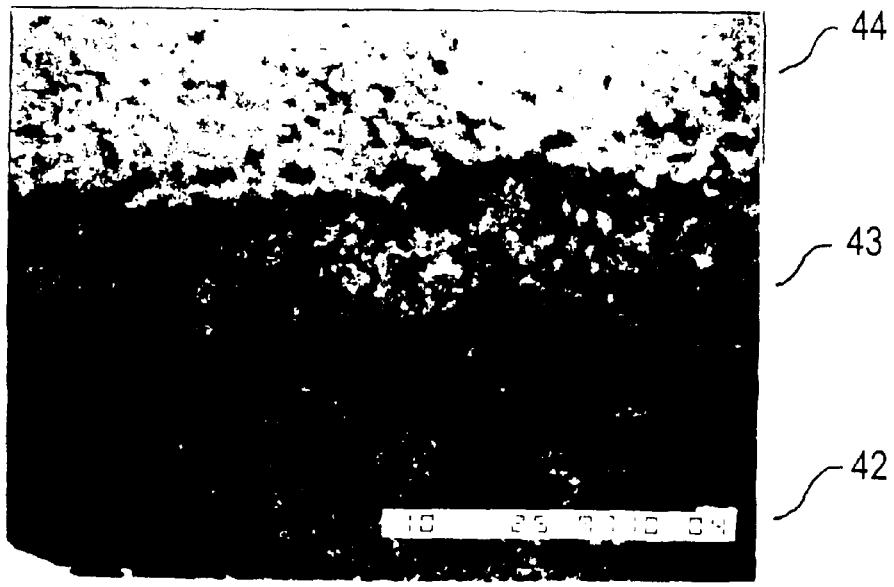
FIG. 12 is a photograph taken of a section of a chip capacitor to which the invention is applied.
Figure 13:
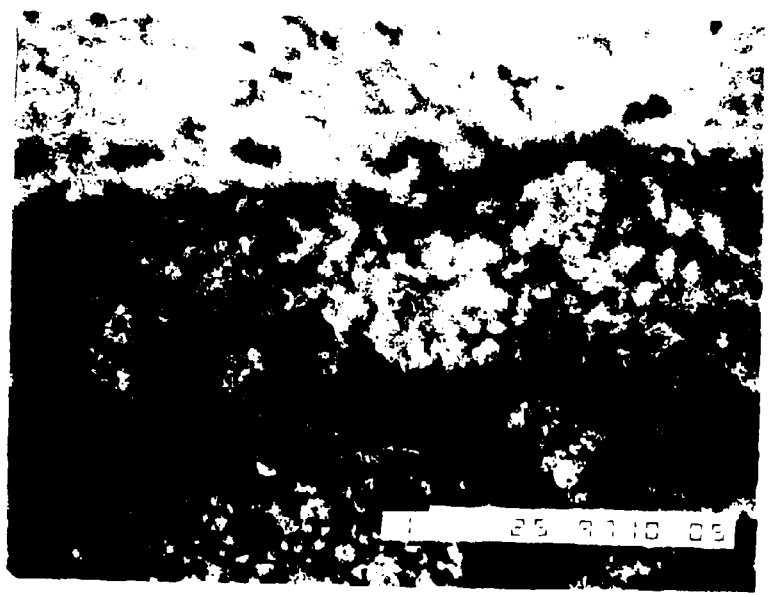
FIG. 13 is a photograph taken of a section of a chip capacitor to which the invention is applied.

Ends of the obtained samples 1 to 3 were observed after cutting. Photographs taken of sections of samples 1 to 3 are attached thereto as FIGS. 8 to 10. An enlarged photograph of FIG. 10 is attached hereto as FIG. 11, a photograph taken of an end face of FIG. 9 upon etching of copper oxide thereon by fluoric acid is attached hereto as FIG. 12, and an enlarged photograph of FIG. 12 is attached hereto as FIG. 13. As can be seen from FIGS. 8 to 10, a chip member 41 is successively provided thereon with a first metal layer 42 containing copper, an intermediate oxide layer 43 containing copper oxide, and a second metal layer 44 containing silver, each in a layer form. It can also be seen (especially from FIG. 13 that the metal (Ag) in the second metal layer is dispersed into the intermediate oxide layer 43, and the dispersed metal particles are bound together in a thread form to form a path from the first metal layer 42 to the second metal layer 43. At this time, the first metal layer had a thickness of about 20 μm, the intermediate oxide layer had a thickness of about 12 μm, and the second metal layer had a thickness of about 30 μm. The presence of oxygen was identified by EPMA analysis of the intermediate oxide layer, and the presence of $Cu_2O$, $Cu_3O_4$, and CuO was identified by x-ray diffraction analysis of the intermediate oxide layer.

Then, the sample obtained by heating at the heating rate of 2,400° C/h and firing at the holding temperature of 680° C., and a comparative sample free of the first metal layer, intermediate oxide layer and second metal layer were each successively provided thereon with a nickel plating layer, and a tin-lead alloy plating layer by an electrolytic process. Lead wires were soldered to both terminals of each of the samples. While the chip member with the lead wires attached thereto was set on a weighted tester, it was pulled in a vertical direction to measure tensile strength at the instant when the terminals broke down. The ESR of each sample was also measured. The results are given below.

|  | Tensile Strength (kg) | ESR (mΩ) |
|---|---|---|
| Sample | 4 | 20 |
| Comparative Sample | 4 | 0.5 |

Example 19

Figure 14:
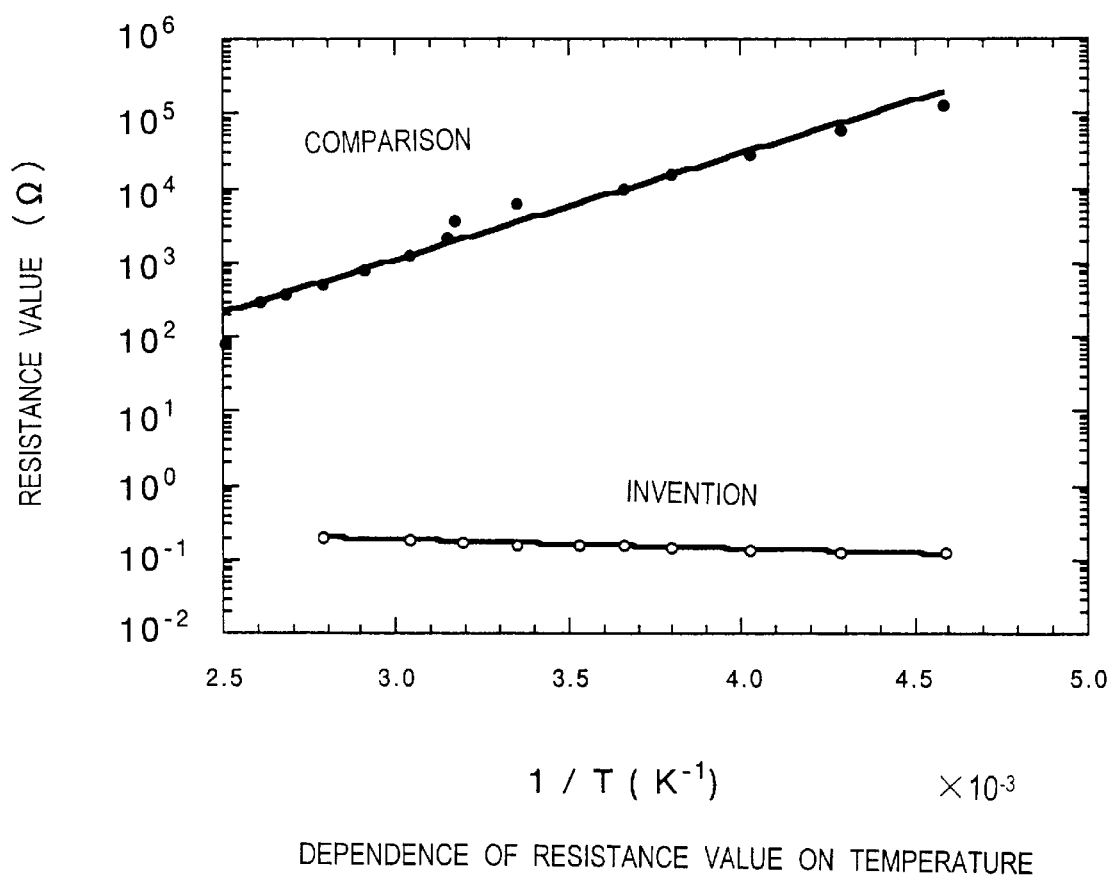
FIG. 14 is a graph showing resistance value changes with temperature of a resistor sample according to the invention is applied, and a comparative sample.

A sample obtained by forming on the substrate prepared in Example 10 the first metal layer, intermediate oxide layer and second metal layer prepared in Example 18, and a sample free of them were measured for temperature characteristics. The results are plotted in FIGS. 14 to 16. FIG. 14 shows resistance value changes with temperature of the inventive sample and comparative sample, FIG. 15 shows changes-with-temperature in the resistance vs. frequency characteristics of the inventive sample, and FIG. 16 shows changes-with-temperature in the resistance vs. frequency characteristics of the comparative sample.

Figure 15:
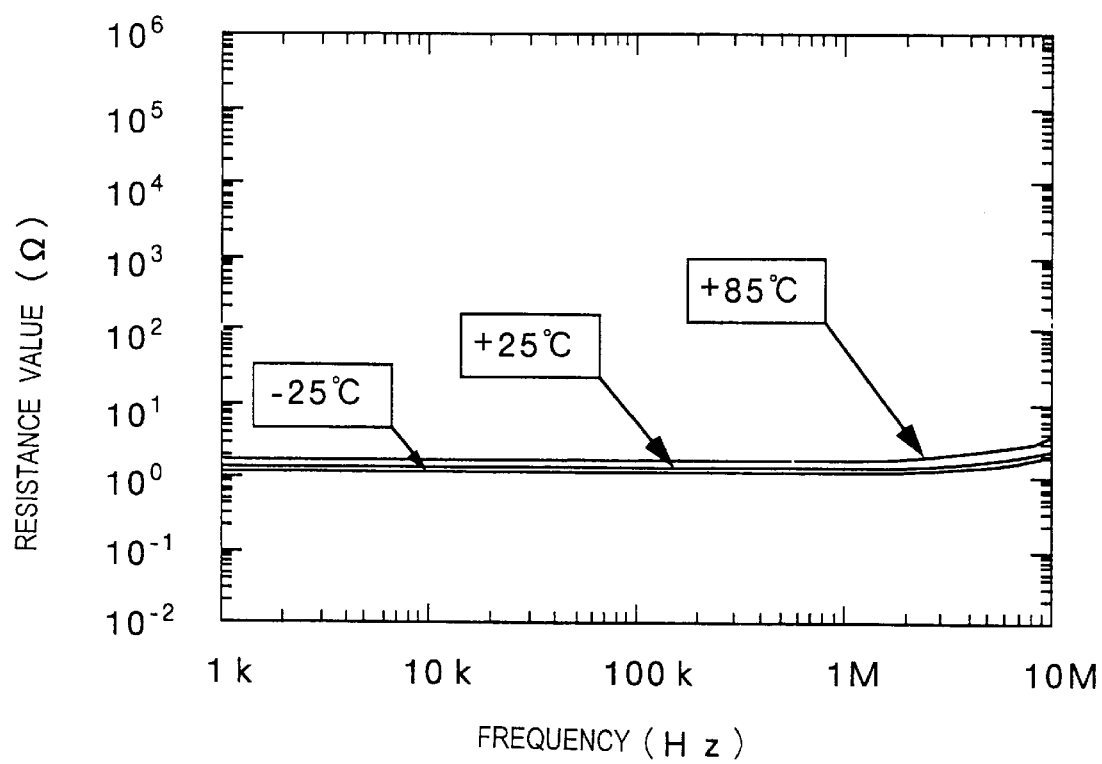
FIG. 15 is a graph showing changes-with-temperature of the resistance vs. frequency characteristics of a sample according to the invention.
Figure 16:
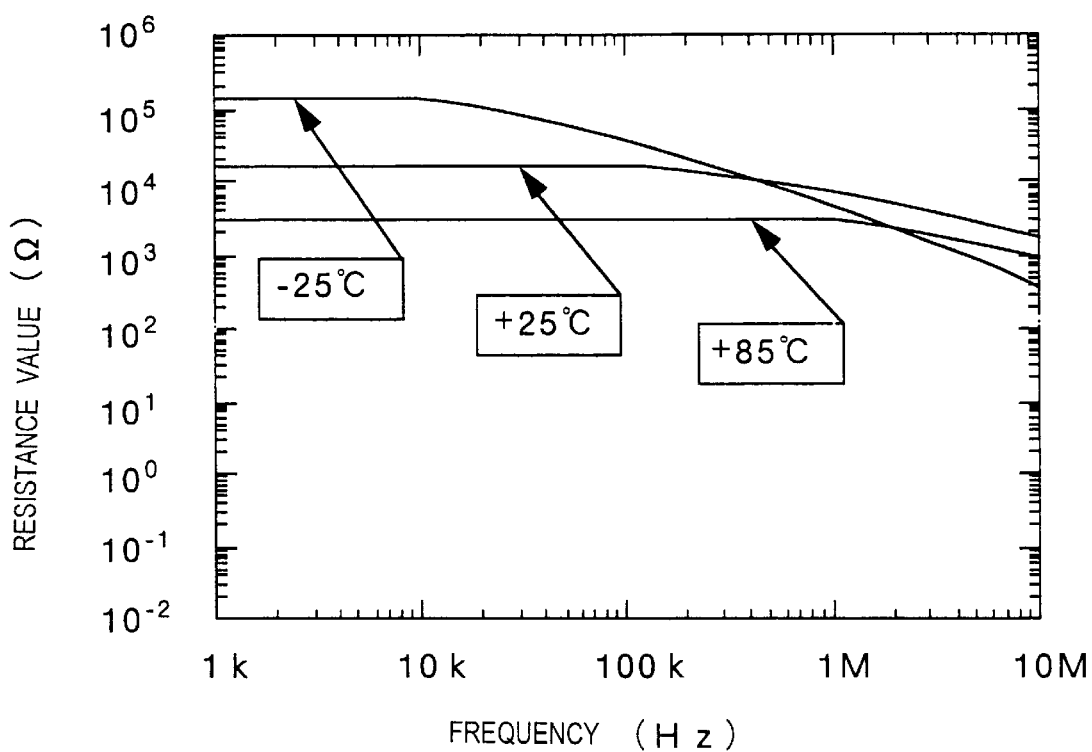
FIG. 16 is a graph showing changes-with-temperature of the resistance vs. frequency characteristics of a comparative sample.

As can be seen from FIGS. 14 to 16, the inventive sample is hardly affected by temperature, and so is stable.

Each of the samples obtained as mentioned above and having varying rates of dispersion of Ag was analyzed on an image analyzer (IP1000 made by Asahi Chemical Industry Co., Ltd.) to measure the entire area of the Cu oxide-containing intermediate oxide layer and the entire area of the intermediate oxide layer occupied by the Ag particles, thereby finding the area ratio ($Ag/Cu_2O+Ag$) between both. The resistance value of each sample was also measured. The results are plotted in FIG. 17.

Figure 17:
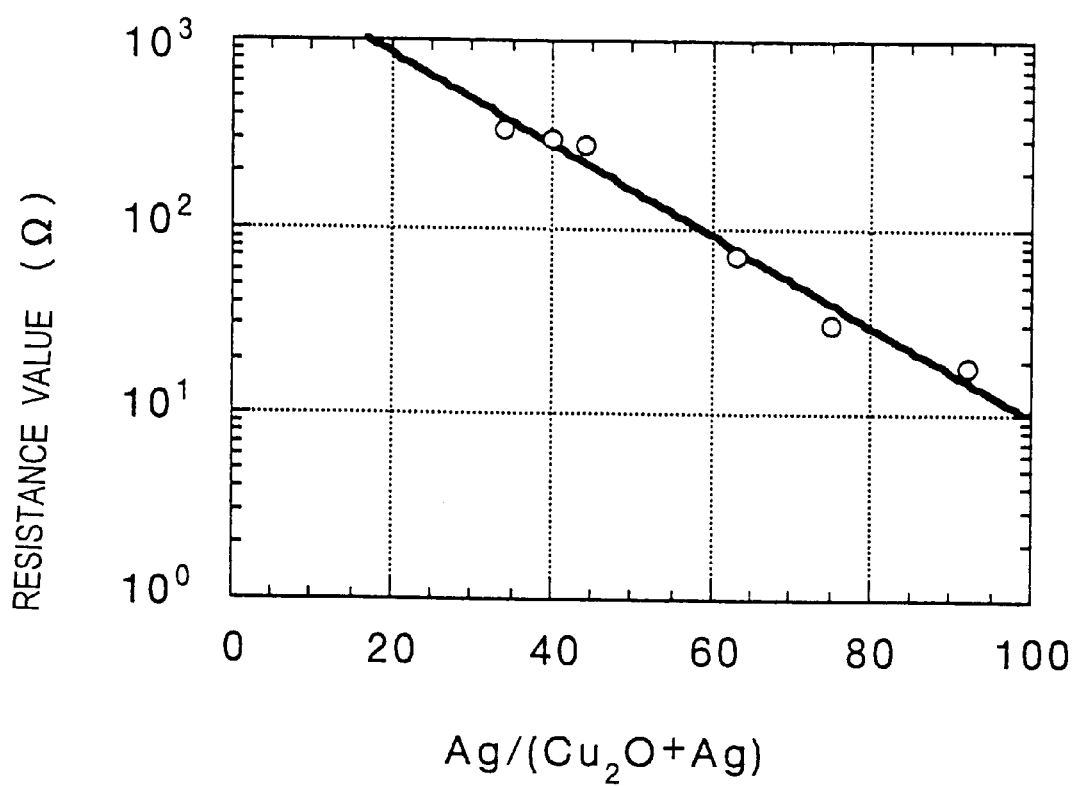
FIG. 17 is a graph showing relationships among the entire area of an intermediate oxide layer, the proportion of the entire area occupied by Ag particles as identified upon observation of the intermediate oxide layer (the ratio of diffusion of Ag), and resistance.

As can be seen from FIG. 17, the sample having a large area ratio of Ag particles (rate of dispersion) has low resistance whereas the sample having a small area ratio of Ag particles (rate of dispersion) has high resistance, and both have a substantially proportional relation to each other.

ADVANTAGES OF THE INVENTION

According to the invention as explained above, it is possible to achieve a method of fabricating an electronic device, which enables a uniform oxide layer to be obtained by a simple process step, makes control of a resistance value provided by the oxide layer so easy that high precision is achieved, improves a bonding strength of the oxide layer with respect to other metal-containing layer, and such an electronic device, and provides a good bonding strength with respect to lead wires, and such an electronic device.

It is also possible to achieve a method of fabricating an electronic device which has stable temperature characteristics, and such an electronic device.

What is claimed is:

1. An electronic device comprising a first metal layer containing at least a metal and a second metal layer formed by firing of a metal particle, with an intermediate oxide layer interleaved between said two metal layers, wherein:

an oxidation-reduction equilibrium curve for the metal particle contained in said second metal layer is positioned above an oxidation-reduction equilibrium curve for the metal contained in said first metal layer, and said intermediate oxide layer comprises an oxide of the metal contained in said first metal layer; wherein:

a dielectric layer and an internal electrode alternately stacked one upon another to form a multilayer structure, terminal electrodes formed at ends of said multilayer structure are electrically connected to said internal electrode to provide a capacitor, and at least one of said terminal electrodes comprises, in order form an internal electrode side, said first metal layer, said intermediate oxide layer, and said second electrode layer.

2. The electronic device according to claim 1, wherein:

electrical conduction is made between said first metal layer and said second metal layer via said intermediate oxide layer, and said intermediate oxide layer acts as a resistor.

3. The electronic device according to claim 1, wherein:

said first metal layer comprises one or two or more of Fe, Co, Cu, and Ni, and said second metal layer comprises one or two or more of Ag, Au, Pt, Pd, Rh, Ir, and Ru.

4. The electronic device according to claim 1, wherein said intermediate oxide layer comprises as an oxide one or two or more of FeO, $\alpha$-$Fe_2O_3$, $\gamma$-$Fe_2O_3$, $Fe_3O_4$, CoO, $Co_3O_4$, $Cu_2O$, $Cu_3O_4$, CuO, and NiO.

5. The electronic device according to claim 1, wherein said first metal layer, said intermediate oxide layer, and said second metal layer comprise 0 to 20 wt % of glass.

6. The electronic device according to claim 1, wherein said terminal electrodes are each provided on an outside with a plated layer.

7. The electronic device according to claim 1, wherein an equivalent circuit includes a series RC or RLC circuit.

8. The electronic device according to claim 1, wherein a layer of said internal electrode comprises Ni.

9. An electronic device comprising a first metal layer containing a first metal which provides an oxide upon firing in an oxidizing atmosphere and a second metal layer formed by firing of particles of a second metal which is not oxidized even upon firing in an oxidizing atmosphere, with an intermediate oxide layer interleaved between said two metal layers, wherein:

said intermediate oxide layer comprises an oxide of the first metal contained in said first metal layer, while the second metal particles contained in said second metal layer are dispersed in said intermediate oxide layer; wherein electrical conduction is made between said first metal layer and said second metal layer via said intermediate oxide layer, and said intermediate oxide layer acts as a resistor; and wherein a dielectric layer and an internal electrode are alternately stacked one upon another to form a multilayer structure, terminal electrodes formed at ends of said multilayer structure are electrically connected to said internal electrode to provide a capacitor, and at least one of said terminal electrodes comprises, in order from an internal electrode side, said first metal layer, said intermediate oxide layer, and said second electrode layer.

10. The electronic device according to claim 9, wherein a layer of said internal electrode comprises Ni.

11. The electronic device according to claim 9, wherein said second metal particles dispersed in said intermediate oxide layer are present in a metal particle state and/or in a state in which some metal particles are coalesced together.

12. The electronic device according to claim 9, wherein said intermediate oxide layer has a conduction path in which some of said second metal particles dispersed therein are coalesced together.

13. The electronic device according to claim 9, wherein a content of said second metal particles dispersed in said intermediate oxide layer is 20 to 99% provided that a ratio of an area occupied by an oxide of said second metal particles, as identified by observation of a section of the formed intermediate oxide layer, with respect to an entire area of said intermediate oxide layer is represented by {(an entire area of dispersed particles) divided by (the entire area of said intermediate oxide layer)} multiplied by 100.

14. The electronic device according to claim 9, wherein the second metal particles contained in said second metal layer have an average particle size of 0.01 to 10 $\mu$m.

15. The electronic device according to claim 9, wherein the first metal particles contained in said first metal layer have an average particle size of 0.1 to 5 $\mu$m, and the second metal particles contained in said second metal layer have an average particle size of 0.05 to 5 $\mu$m.

16. The electronic device according to claim 9, wherein:

the second metal particles contained in said second metal layer comprise one or two or more metal elements selected from Ag, Pt, Rh, Ru, Ir, Au, and Pd, and said first metal layer comprises a metal other than said second metal component or an alloy of said metal with said second metal component.

17. The electronic device according to claim 9, wherein said second metal layer comprises a glass frit in an amount of 0 to 20 wt % relative to a total amount of metals.

18. The electronic device according to claim 17, wherein said glass frit has a softening point of 350° C. to 500° C. inclusive.

19. The electronic device according to claim 17, wherein said glass frit has a softening point that ranges from 300° C. to less than 350° C.

20. The electronic device according to claim 17, wherein said glass frit has a softening point that ranges from greater than 500° C. to less than or equal to 1,000° C.

21. The electronic device according to claim 9, wherein said intermediate oxide layer comprises as an oxide one or two or more of FeO, $\alpha$-$Fe_2O_3$, $\gamma$-$Fe_2O_3$, $Fe_3O_4$, CoO, $Co_3O_4$, $Cu_2O$, $CU_3O_4$, CuO, and NiO.

22. The electronic device according to claim 9, wherein said first metal layer comprises one or two or more of Fe, Co, Cu, and Ni.

23. The electronic device according to claim 9, wherein a resistor portion formed from said first metal layer to said second metal layer has a zero or positive temperature coefficient.

24. The electronic device according to claim 9, wherein said terminal electrodes are each provided on an outside with a plated layer.

25. The electronic device according to claim 9, wherein an equivalent circuit includes a series RC or RLC circuit.

* * * * *

UNITED STATES PATENT AND TRADEMARK OFFICE
CERTIFICATE OF CORRECTION

PATENT NO. : 6,124,769

DATED : September 26, 2000

INVENTOR(S): Katsuhiko IGARASHI, et al.

It is certified that an error appears in the above-identified patent and that said Letters Patent is hereby corrected as shown below:

On the Title Page, Item [54], and Column 1, the Title is incorrect. The Title should read as follows:

--[54] MULTILAYER DEVICE WITH A TERMINAL ELECTRODE HAVING AN INTERMEDIATE OXIDE LAYER --

Signed and Sealed this

Eighth Day of May, 2001

Attest:

NICHOLAS P. GODICI

*Attesting Officer*     Acting Director of the United States Patent and Trademark Office

UNITED STATES PATENT AND TRADEMARK OFFICE
CERTIFICATE OF CORRECTION

PATENT NO. : 6,124,769
DATED : September 26, 2000
INVENTOR(S) : Katsuhiko Igarashi et al Page 1 of 1

It is certified that error appears in the above-identified patent and that said Letters Patent is hereby corrected as shown below:

<u>Column 34,</u>
Line 19, "a dielectric layer and an internal electrode alternately" should read -- a dielectric layer and an internal electrode are alternately --.

Line 26, "order form an internal electrode" should read -- order from an internal electrode --.

Line 51, "a series RC or RLC circuit." should read -- a series RC or LCR circuit. --.

<u>Column 36,</u>
Line 35, "a series RC or RLC circuit." should read -- a series RC or LCR circuit. --.

Signed and Sealed this

Seventh Day of August, 2001

*Attest:*

*Attesting Officer*

NICHOLAS P. GODICI
*Acting Director of the United States Patent and Trademark Office*